US011455124B2

(12) United States Patent
Agarwal et al.

(10) Patent No.: US 11,455,124 B2
(45) Date of Patent: Sep. 27, 2022

(54) COMMAND PRIORITIZATION TO REDUCE LATENCIES OF ZONE COMMANDS

(71) Applicant: WESTERN DIGITAL TECHNOLOGIES, INC., San Jose, CA (US)

(72) Inventors: Dinesh Kumar Agarwal, Karnataka (IN); Amit Sharma, Karnataka (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/180,642

(22) Filed: Feb. 19, 2021

(65) Prior Publication Data

US 2022/0113905 A1 Apr. 14, 2022

Related U.S. Application Data

(60) Provisional application No. 63/090,130, filed on Oct. 9, 2020.

(51) Int. Cl.
*G06F 3/06* (2006.01)

(52) U.S. Cl.
CPC .......... *G06F 3/0659* (2013.01); *G06F 3/0611* (2013.01); *G06F 3/0631* (2013.01); *G06F 3/0673* (2013.01)

(58) Field of Classification Search
CPC .... G06F 3/0659; G06F 3/0611; G06F 3/0631; G06F 3/0673; G06F 3/067; G06F 12/0223; G06F 12/0238
See application file for complete search history.

(56) References Cited

U.S. PATENT DOCUMENTS 7,272,692 B2 9/2007 Barnum et al.
8,825,940 B1 9/2014 Diggs
(Continued)

FOREIGN PATENT DOCUMENTS

WO 2015073608 A1 5/2015

OTHER PUBLICATIONS

H. Shin, M. Oh, G. Choi and J. Choi, "Exploring Performance Characteristics of ZNS SSDs: Observation and Implication," 2020 9th Non-Volatile Memory Systems and Applications Symposium (NVMSA), 2020, pp. 1-5. (Year: 2020).*

(Continued)

*Primary Examiner* — Khoa D Doan
(74) *Attorney, Agent, or Firm* — ArentFox Schiff LLP

(57) ABSTRACT

Aspects of a storage device including a memory and a controller are provided which re-prioritize commands based on zone properties. The controller receives from a host commands associated with a plurality of zones, allocates the memory into a plurality of zone resources based on zone properties indicated by the host for the zones, and identifies a utilization state of the memory for one of the zones. The controller changes a priority order of the commands based on the zone properties and the utilization state for the one of the zones. The controller then executes the commands in the memory or zone resources according to the priority order. As a result, execution of commands may be balanced between zones and lower latencies may be achieved overall for each zone. Improved performance or throughput of the storage device in handling zone commands may therefore result.

20 Claims, 15 Drawing Sheets

(56) References Cited

U.S. PATENT DOCUMENTS

| | | |
|---|---|---|
| 9,477,408 B1 | 10/2016 | Perlstein et al. |
| 10,002,086 B1 | 6/2018 | Achtenberg et al. |
| 10,372,376 B2 | 8/2019 | Singh et al. |
| 10,503,404 B2* | 12/2019 | Frolikov ............... G06F 3/0673 |
| 2006/0253621 A1* | 11/2006 | Brewer ................ G06F 3/067 |
| | | 710/40 |
| 2017/0024137 A1* | 1/2017 | Kanno ................ G06F 3/064 |
| 2018/0349285 A1* | 12/2018 | Ish ...................... G06F 12/0246 |
| 2019/0278523 A1* | 9/2019 | Benisty ............... G06F 3/0659 |

OTHER PUBLICATIONS

D. C. V. Moolenbroek, R. Appuswamy and A. S. Tanenbaum, "Transaction-Based Process Crash Recovery of File System Namespace Modules," 2013 IEEE 19th Pacific Rim International Symposium on Dependable Computing, 2013, pp. 338-347, doi:10.1109/PRDC. 2013.56. (Year: 2013).*

An IP.com Prior Art Database Technical Disclosure, "Slice Data Rebalancing Policy Based on Uniform Namespace Allocation across All Memory Devices", Mar. 1, 2017 (Year: 2017).*

* cited by examiner

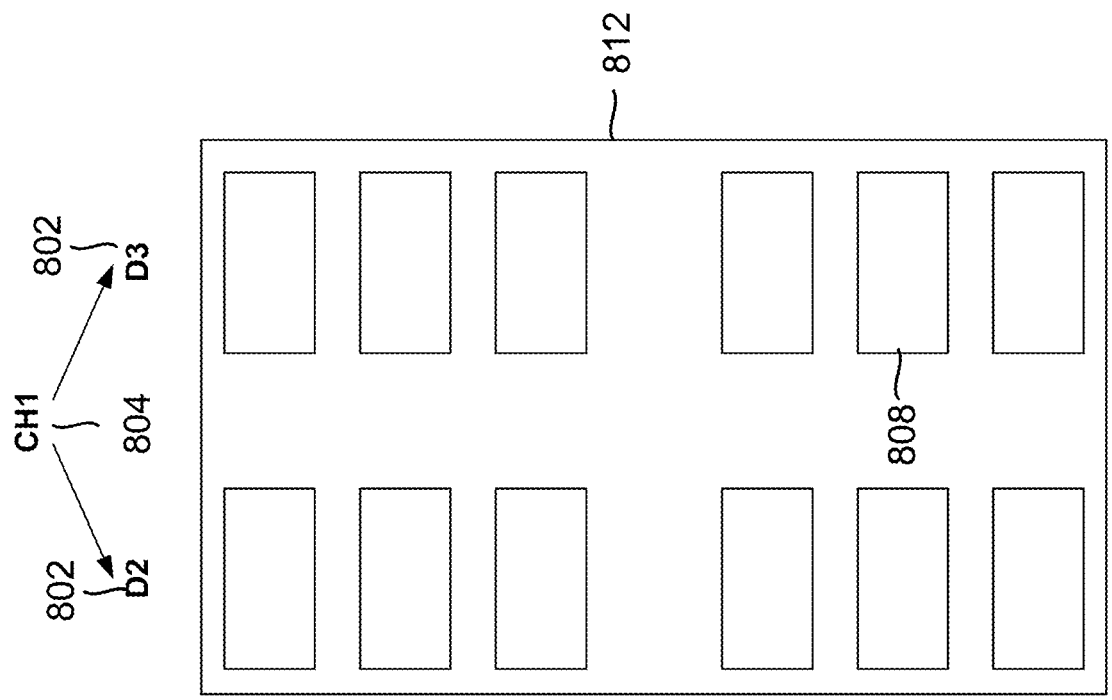
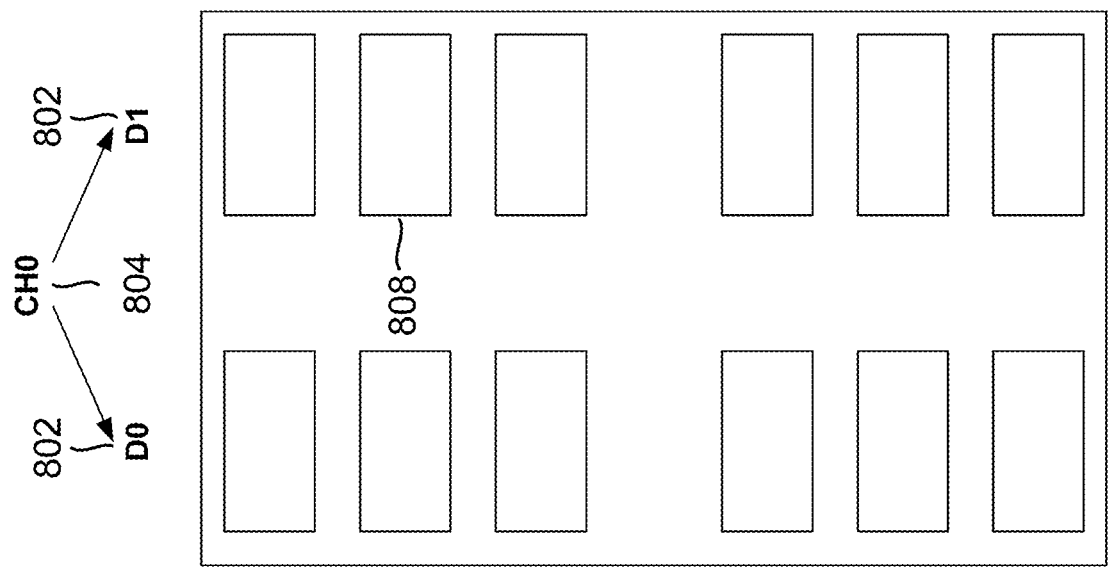
FIG. 8

COMMAND PRIORITIZATION TO REDUCE LATENCIES OF ZONE COMMANDS

CROSS-REFERENCE TO RELATED APPLICATION

This application claims the benefit of, and right of priority to, U.S. Provisional Patent Application No. 63/090,130, entitled "Command Prioritization to Reduce Latencies of Zone Commands," filed on Oct. 9, 2020, the entire contents of which are herein incorporated by reference as if fully set forth herein.

BACKGROUND

Field

This disclosure is generally related to electronic devices and more particularly to storage devices.

Background

Storage devices enable users to store and retrieve data. Examples of storage devices include non-volatile memory devices. A non-volatile memory (NVM) generally retains data after a power cycle. An example of a non-volatile memory is a flash memory, which may include array(s) of NAND cells on one or more dies. Flash memory may be found in solid-state devices (SSDs), Secure Digital (SD) cards, and the like.

Zoned Namespace (ZNS) is an SSD namespace architecture in which a range of logical addresses in the non-volatile memory (e.g. a zoned namespace) is divided into fixed-sized groups of logical addresses, or zones. Each zone within the zoned namespace is used for a specific application. For example, the host may write data associated with different applications in different zones of the zoned namespace. The flash storage device interfaces with the host to obtain the defined zones, and maps the zones to blocks in the flash memory. Thus, the host may write separate application-related data into separate blocks of flash memory.

The host may expect different zones to have different command execution speeds or latencies. For example, when configuring zones for the flash storage device, the host may indicate to the flash storage device not only the size of each zone (e.g. the number of logical addresses to be grouped into a particular zone), but also the minimum or maximum speed or latency the host expects when writing data to each zone. The flash storage device may take these different host expectations or zone requirements into account when mapping the zones to blocks in the flash memory. For example, to provide fast command execution speeds to satisfy specified zone requirements, the flash storage device may map a particular zone to blocks in different dies of flash memory in order to allow parallel data writes in the different dies.

However, when multiple zones share the same underlying resources (e.g. the same dies or channels) of the flash storage device, then commands associated with one zone may delay execution of commands associated with another zone and impact the achievability of zone requirements. For example, the flash storage device may operate in a multi-queue depth environment where the flash storage device receives large commands including logical addresses associated with blocks of multiple dies. In such case, if the flash storage device initially receives a command to write data in a first zone associated with blocks of multiple dies and subsequently receives a command to write data in a second zone associated with blocks of the same dies, the flash storage device may utilize all of the dies (e.g. occupy the device bandwidth) for the initial command in the first zone and thus delay execution of the subsequent command in the second zone. As a result, the subsequent command in the second zone may experience higher latencies, preventing that zone's requirements (e.g. the intended speed or latency expected by the host) from being achieved.

SUMMARY

One aspect of a storage device is disclosed herein. The storage device includes a memory and a controller. The controller is configured to receive from a host commands associated with a plurality of zones, to change a priority order of the commands based on zone properties indicated by the host for the zones, and to execute the commands in the memory according to the priority order.

Another aspect of a storage device is disclosed herein. The storage device includes a memory and a controller. The controller is configured to receive from a host commands associated with a plurality of zones, to allocate the memory into a plurality of zone resources based on zone properties indicated by the host for the zones, and to execute the commands in the zone resources.

A further aspect of a storage device is disclosed herein. The storage device includes a memory and a controller. The controller is configured to receive from a host commands associated with a plurality of zones, to identify a utilization state of the memory for one of the zones, and to change a priority order of the commands based on the utilization state for the one of the zones.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein:

FIG. 8 is a conceptual diagram illustrating an example of dedicated resources for different zones in the storage device of FIG. 1.

DETAILED DESCRIPTION

Figure 1:
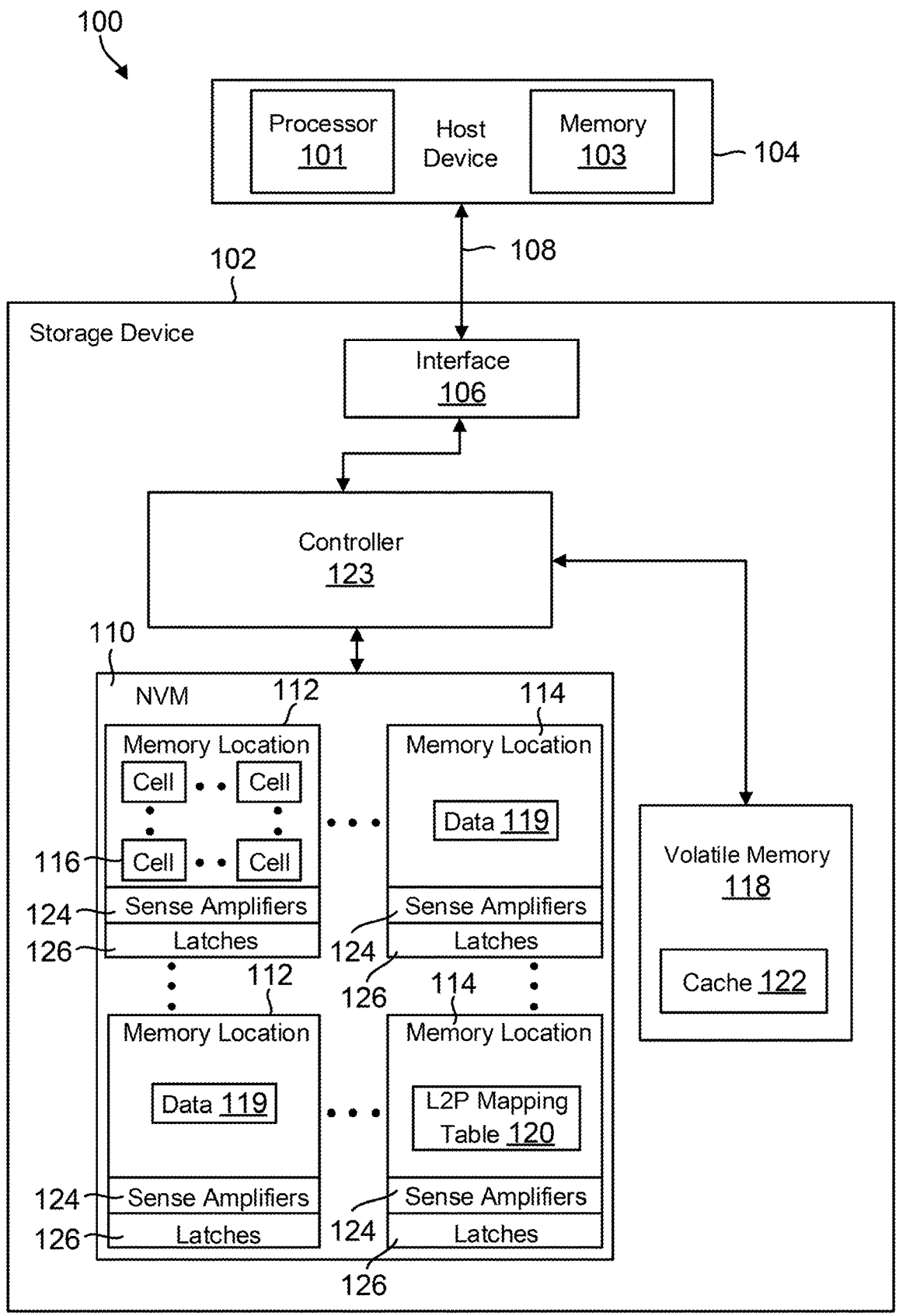
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

Typically, in ZNS, a host provides a definition of zones, or groups of logical addresses, to a flash storage device. For example, the host may indicate that one group of LBAs, or one logical block, is associated with a first zone, that another group of LBAs, or another logical block, is associated with a second zone, and so forth. The flash storage device may then map each logical block to one or more physical blocks in the flash memory. For instance, the flash storage device may map the LBAs associated with the first zone to a first physical block, the LBAs associated with the second zone to a second physical block, etc. The flash storage device may then write and read data in the blocks associated with the zones.

The host may also indicate to the flash storage device different zone properties, such as an intended zone speed or latency, or other zone requirements expected by the host for each particular zone. The different zone properties may be application-specific. For instance, the host may indicate to the flash storage device that a first zone to be used for storing critical application data requires higher performance speeds (e.g. data write speeds of 150 Mbps at minimum), while a second zone to be used for storing other application data requires lower performance speeds (e.g. data writes of 50 Mbps at minimum). Alternatively, the host may indicate that the zones require similar speeds (e.g. both the first and second zones require data write speeds of 100 Mbps at minimum). The host may indicate these zone requirements when configuring the zones for the flash storage device.

To satisfy specified zone requirements such as minimum and maximum write speeds or latencies for a particular zone, the flash storage device may map the LBAs associated with that zone across different dies of flash memory. For example, if the flash storage device includes four dies of flash memory, the flash storage device may map a first quarter of the LBAs associated with a zone to one or more blocks in the first die, a second quarter of the LBAs associated with the zone to one or more blocks in the second die, a third quarter of the LBAs associated with the zone to one or more blocks in the third die, and a fourth quarter of the LBAs associated with the zone to one or more blocks in the fourth die. The flash storage device may similarly map other zones defined by the host in one or more other blocks of the same dies. Such mapping of zones across multiple dies may allow for the flash storage device to write data to a zone in parallel between the different dies, thus allowing the flash storage device to accommodate fast write speeds or low latencies for that zone.

However, when multiple zones are mapped to blocks in the same dies of the flash storage device and the host requests the flash storage device to write data to different zones, the intended zone write speeds or latencies may not be achieved for all of the zones. For example, if the flash storage device receives a write command for a large amount of data in a first zone spanning across multiple dies and a subsequent write command for a small amount of data in a second zone spanning across the same dies, the flash storage device may utilize the entire device bandwidth (e.g. all of the dies) to write data in the first zone while delaying writing data in the second zone. As a result, the writing of the data in the first zone may effectively prevent (or "starve") the writing of the data in the second zone until after the first zone's data is completely written, increasing the second zone's write latency and causing performance in the second zone to not meet zone requirements.

One approach to address this starvation effect between zones is to dedicate different dies for each zone. In this approach, rather than mapping each zone to all of the dies as described above, the flash storage device maps each zone to different, dedicated dies for those zones based on zone requirements. For example, the host may configure two zones both having minimum write speeds of 100 Mbps. In such case, assuming each die has a standard write speed of 50 Mbps, the flash storage device may map the LBAs of the first zone to blocks in a first pair of dies and the LBAs of the second zone to blocks in a second, different pair of dies, thereby allowing each zone to have two parallel 50 Mbps writes or effectively 100 Mbps speed. While such approach allows the flash storage device to ensure that minimum data write speeds are always achievable, the maximum data write speed is still limited by the dedicated dies. For example, by limiting each zone to two dies, the flash storage device may not be able to attain more than 100 Mbps speed for each zone, even though the flash storage device may be capable of 200 Mbps speed at its full potential or device bandwidth (based on four dies).

Accordingly, to resolve the starvation effect on zones described above without the limitations inherent in dedicating different dies for each zone, the flash storage device may employ a different approach of prioritizing received commands based on command tracking, zone requirements, and zone utilization. In one example, the flash storage device may track the commands received from the host to write data in each of the zones. Based on the tracked commands for each zone, the flash storage device may reshuffle or prioritize its received commands accordingly. For example, if the flash storage device identifies that multiple write commands are received for a first zone and a write command is subsequently received for a second zone, the flash storage device may reshuffle the commands associated with the different zones in a more interleaved fashion to improve performance for the second zone. For instance, rather than executing all the write commands for the first zone in advance of the write command for the second zone, the flash storage device may re-prioritize the commands such that the command for the second zone is executed immediately after one of the commands for the first zone. In this way, the latency in writing data to the second zone may be reduced.

In another example, the flash storage device may distribute its load (e.g. prioritize its write commands) according to zone requirements based on essential or optional zone resources. As used herein, "zone resources" refers to dies, channels, planes, blocks, pages, or other resources of memory used to store data in a particular zone, "essential" resources refers to zone resources allocated to a zone to meet minimum zone requirements (e.g. a minimum write speed or maximum latency) for that zone, and "optional" resources refer to zone resources allocated to a zone that can be used to optionally provide performance above the minimum zone requirements. For instance, if the flash storage device identifies that a particular zone requires a minimum speed of 100 Mbps, which may be satisfied by two dies each having 50 Mbps speed as described above, the flash storage device may allocate blocks of two of the dies as essential resources for that zone (to accomplish the 100 Mbps speed requirement) and blocks of the remaining dies as optional resources for that zone (to accommodate up to 200 Mbps speeds). The flash storage device may similarly allocate different blocks as essential resources and optional resources for other zones.

After allocating the essential resources and optional resources for the zones, the flash storage device may write data to each zone first in the essential resources and then additionally in the optional resources. For example, when writing data to a zone in response to host commands, the flash storage device may initially write data to the blocks of the two of the dies (the essential resources) before optionally writing data simultaneously to the blocks of the remaining dies (the optional resources). The flash storage device may similarly write to essential resources only, before writing to essential and optional resources together, when writing data to other zones.

The flash storage device may also write data for one zone in parallel with data for another zone in response to host commands associated with the different zones. To accomplish these parallel writes, the flash storage device may allocate the essential resources and optional resources of different zones in different dies or channels. For example, if the flash storage device allocates blocks in a first pair of dies as essential resources for a first zone, the flash storage device may also allocate different blocks in a second pair of dies as essential resources for a second zone. Similarly, the flash storage device may allocate different blocks in the second pair of dies as optional resources for the first zone and different blocks in the first pair of dies as optional resources for the second zone. Thus, the same dies or channels may include one zone's essential resources and another zone's optional resources. Such allocation provides the benefit of the dedicated die approach described above without its limitations, by allowing data writes for different zones to occur in parallel in the essential resources (thereby meeting minimum write speeds per zone requirements) while also preserving optional resources for each zone to accommodate full storage device bandwidth and maximum write speed when other zones' essential resources are not being utilized.

In a further example, the flash storage device may reshuffle or re-prioritize its commands based on the length of the data associated with each command and the essential resources. For instance, assume the flash storage device can write 32 KB of data at one time to a page in a block of a die. In such case, if the flash storage device allocates one block in each of three dies (i.e. three blocks) as essential resources for a first zone and one block in another die as an essential resource for a second zone, the flash storage device may write 96 KB of data to the essential resources for the first zone and 32 KB of data to the essential resource for the second zone. Thus, if the flash storage device receives multiple write commands for each zone, the flash storage device may re-prioritize the commands so that 96 KB of data in the commands is initially written to the essential resources for the first zone and 32 KB of data in the commands is initially (and simultaneously) written to the essential resource for the second zone. If any commands are associated with data lengths larger than the essential resource sizes (e.g. 96 KB and 32 KB respectively in this example), the flash storage device may also split large commands into portions when re-prioritizing the commands.

In an additional example, the flash storage device may track zone over-utilization or under-utilization, and the flash storage device may balance the execution of write commands for each zone by changing a priority or queue order of commands based on the zone utilization. As used herein, "zone over-utilization" refers to a state of a zone where both essential and optional resources of that zone are currently being used to write data for that zone, while "zone under-utilization" refers to a state of a zone where the essential resources of that zone are unavailable for writing due to current utilization of the optional resources of another zone. Thus, one zone may be in an over-utilization state while another zone is in an under-utilization state, and vice-versa. Such states may arise for instance, where blocks of one die are configured as essential resources for a first zone and different blocks of the same die are configured as optional resources for a second zone, since the flash storage device cannot communicate different data to the essential resources and optional resources in the same die (or channel) at the same time. Accordingly, to balance these utilization states and prevent starvation of zones when one zone is in the over-utilization state, the flash storage device may release optional resources of that zone (e.g. prevent those optional resources from being used for data writes in that zone) so that the other zone may use its essential resources. Similarly, when one zone is in an under-utilization state, the flash storage device may thrash the other zone, or change the priority order of queued commands such that the other zone has lower priority, to allow the under-utilized zone to process or continue processing data write commands. Thus, execution of write commands may be balanced between different zones based on utilization states.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the exemplary embodiment of FIG. 1, each memory location 112 may be a die 114 including multiple planes each including multiple blocks of multiple cells 116. Alternatively, each memory location 112 may be a plane including multiple blocks of the cells 116. The cells 116 may be single-level cells, multi-level cells, triple-level cells, quad-level cells, and/or penta-level cells, for example. Other examples of memory locations 112 are possible; for instance, each memory location may be a block or group of blocks. Each memory location may include one or more blocks in a 3-D NAND array. Each memory location 112 may include one or more logical blocks which are mapped to one or more physical blocks. Alternatively, the memory and each memory location may be implemented in other ways known to those skilled in the art.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
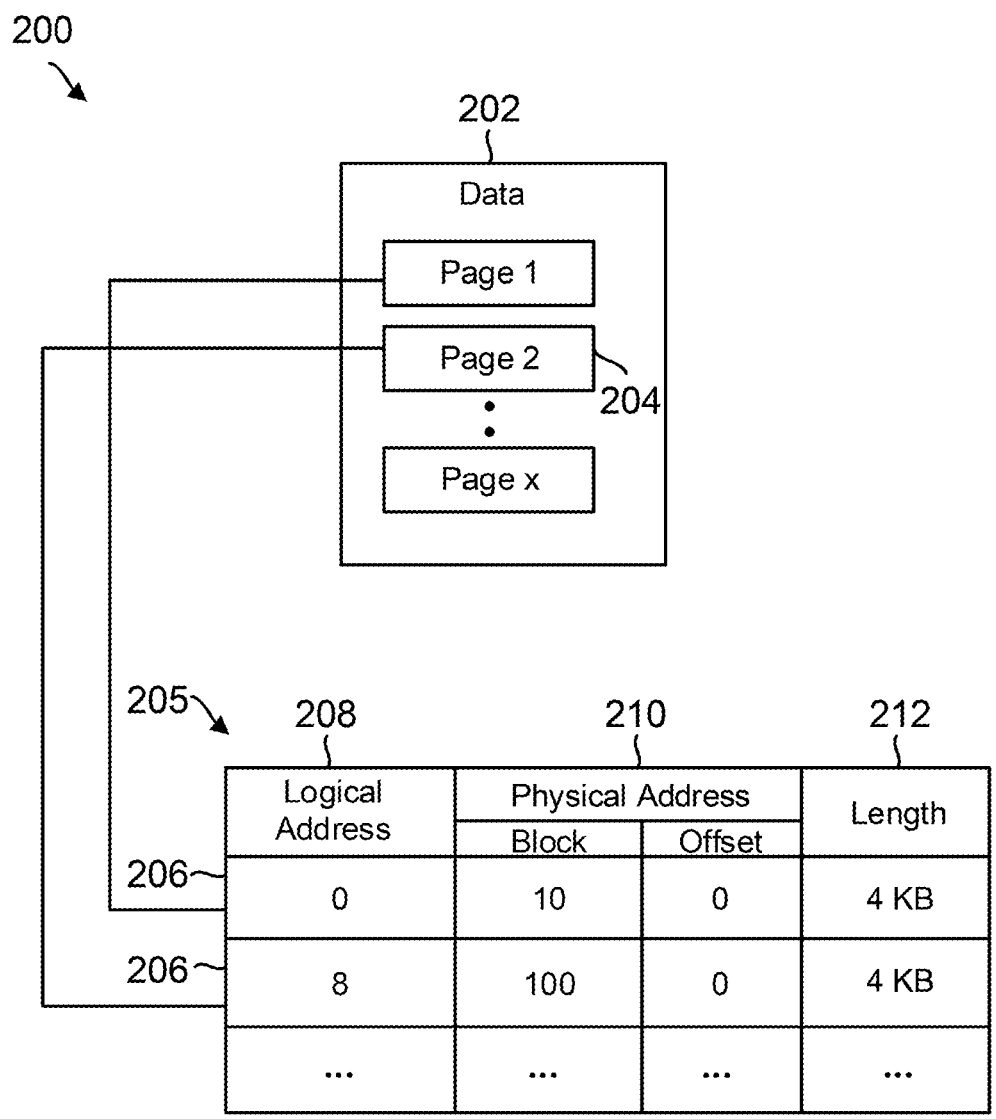
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

Figure 3:
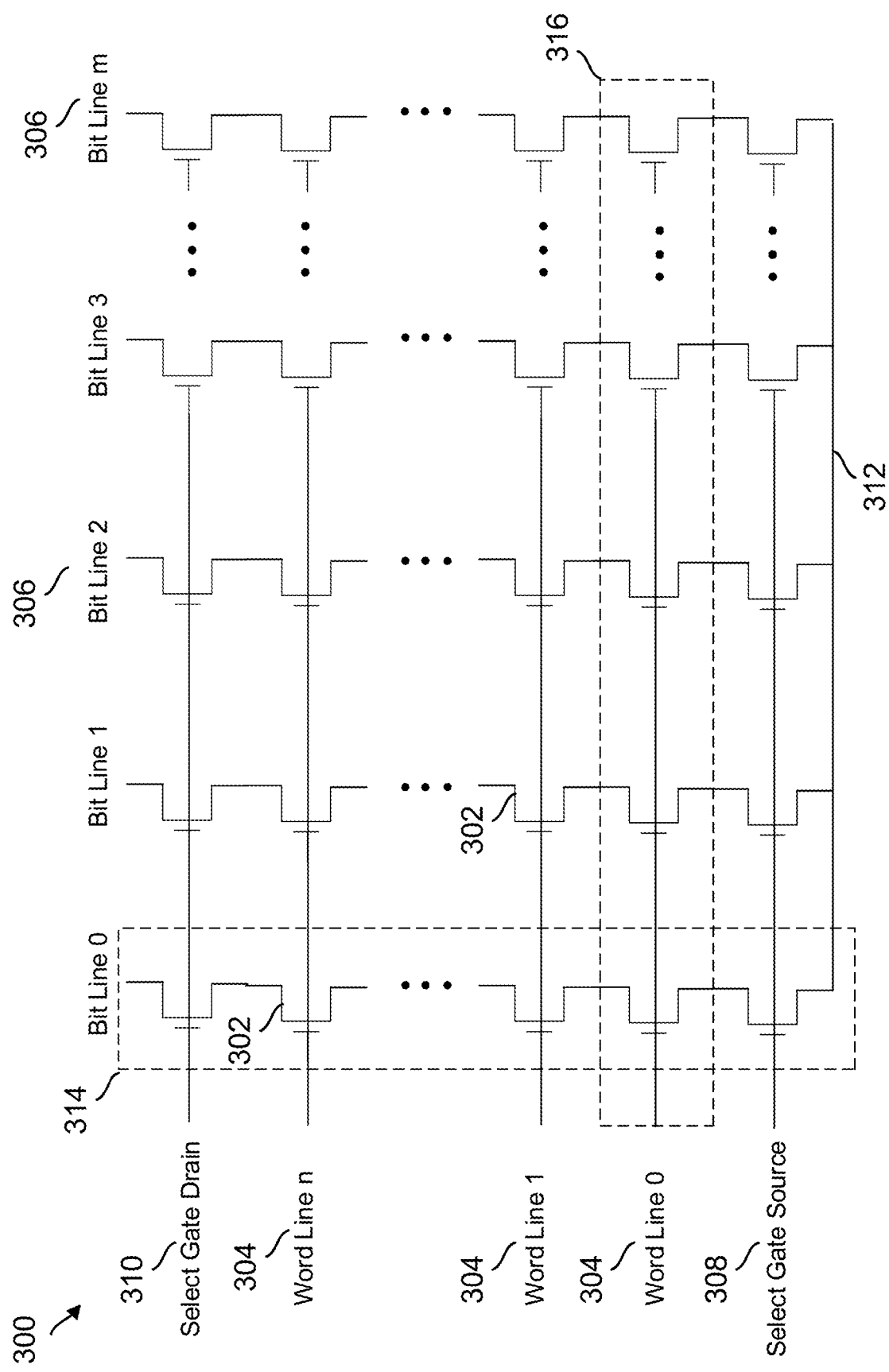
FIG. 3 is a conceptual diagram illustrating an example of an array of memory cells in the storage device of FIG. 1.

FIG. 3 illustrates an example of a NAND memory array 300 of cells 302. Cells 302 may correspond to cells 116 in the NVM 110 of FIG. 1. Multiple cells 302 are coupled to word lines 304 and bit lines 306. For example, the memory array 300 may include n word lines and m bit lines within a block of a die 114 of the NVM 110, where n and m are predefined according to the size of the block. Each word line and bit line may be respectively associated with a row and column address, which the controller 123 may use to select particular word lines and bit lines (e.g. using a row and column decoder). For example, word lines 0-n may each be associated with their own row address (e.g. word line 0 may correspond to word line address 0, word line 1 may correspond to word line address 1, etc.), and bit lines 0-m may each be associated with their own column address (e.g. bit line 0 may correspond to bit line address 0, bit line 1 may correspond to bit line address 1, etc.). Select gate source (SGS) cells 308 and select gate drain (SGD) cells 310 are coupled to the memory cells 302 on each bit line 306. The SGS cells 308 and SGD cells 310 connect the memory cells 302 to a source line 312 (e.g. ground) and bit lines 306, respectively. A string 314 may include a group of cells 302 (including SGS and SGD cells 308, 310) coupled to one bit line within a block, while a page 316 may include a group of cells 302 coupled to one word line within the block.

Figure 4:
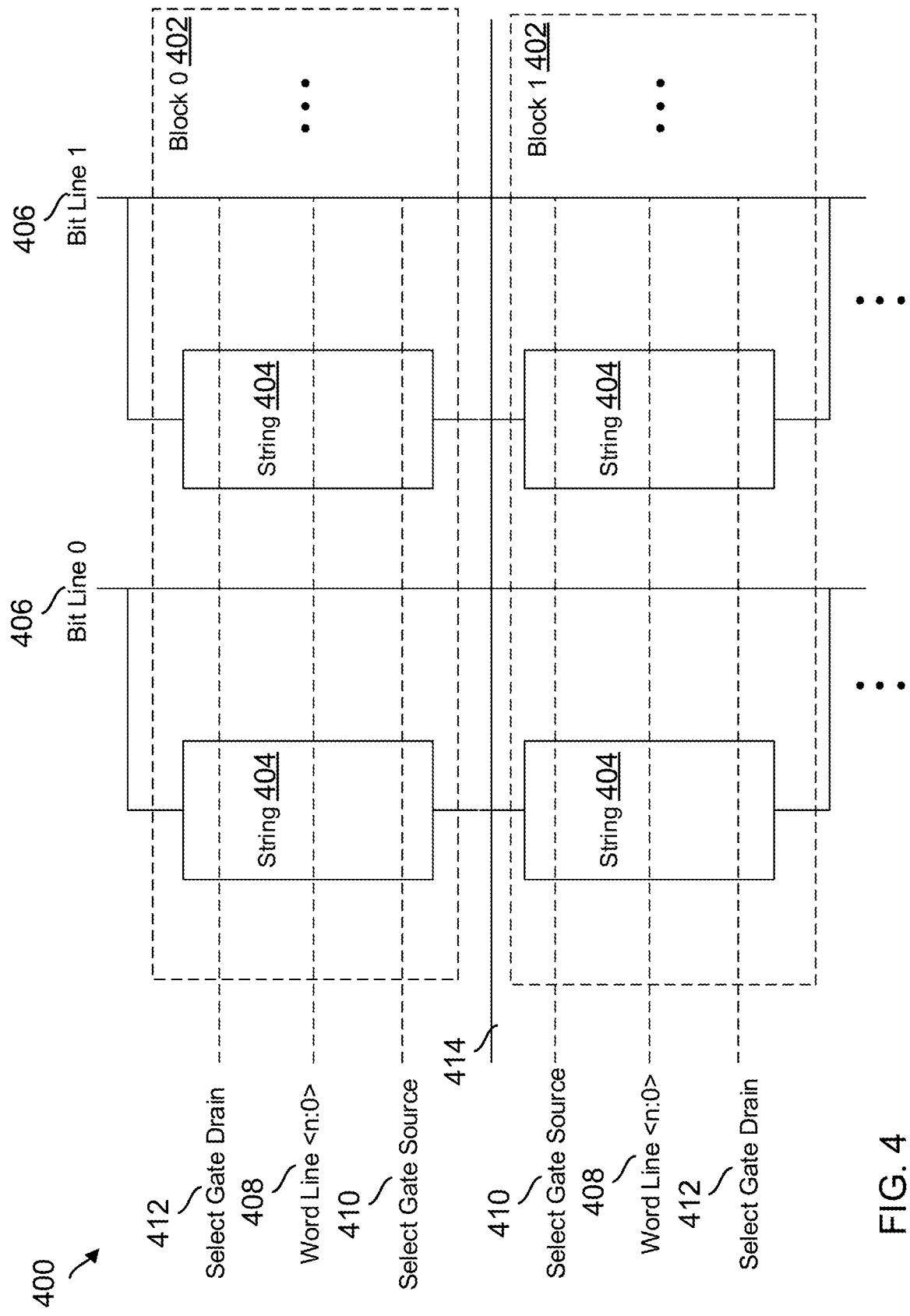
FIG. 4 is a conceptual diagram illustrating an example of an array of blocks in the storage device of FIG. 1.

FIG. 4 illustrates an example of a NAND memory array 400 of blocks 402 including multiple strings 404. Blocks 402 may correspond to blocks of a die 114 in the NVM 110 of FIG. 1, and strings 404 may each correspond to string 314 in FIG. 3. As in the memory array 300 of FIG. 3, each string 404 may include a group of memory cells each coupled to a bit line 406 and individually coupled to respective word lines 408. Similarly, each string may include a SGS cell 410 and SGD cell 412 which respectively connects the memory cells in each string 404 to a source line 414 and bit line 406.

When the controller 123 reads data from or writes data to a page 316 of cells 302 (i.e. on a word line 304, 408), the controller may send a command to apply a read voltage or program voltage to the selected word line and a pass through voltage to the other word lines. The read or programmed state of the cell (e.g. a logic '0' or a logic '1' for SLCs) may then be determined based on a threshold voltage of the cells 302. For example, during an SLC read operation, if the threshold voltage of a cell 302 is smaller than the read voltage (i.e. current flows through the cell in response to the read voltage), the controller 123 may determine that the cell stores a logic '1', while if the threshold voltage of the cell 302 is larger than the read voltage (i.e. current does not flow through the cell in response the read voltage), the controller 123 may determine that the cell stores a logic '0'. Similarly, during an SLC program operation, the controller may store a logic '0' by sending a command to apply the program voltage to the cell 302 on the word line 304, 408 until the cell reaches the threshold voltage, and during an erase operation, the controller may send a command to apply an erase voltage to the block 402 including the cells 302 (e.g. to a substrate of the cells such as a p-well) until the cells reduce back below the threshold voltage (back to logic '1').

The controller 123 may also write and read data in zones configured by the host 104.

For example, in ZNS, groups of contiguous, non-overlapping logical addresses (e.g. LBAs 208) may be divided into different zones. The controller may read data from or write data to pages 316 of cells 302 in the blocks 402 corresponding to the logical addresses 208 associated with the different zones.

Figure 5:
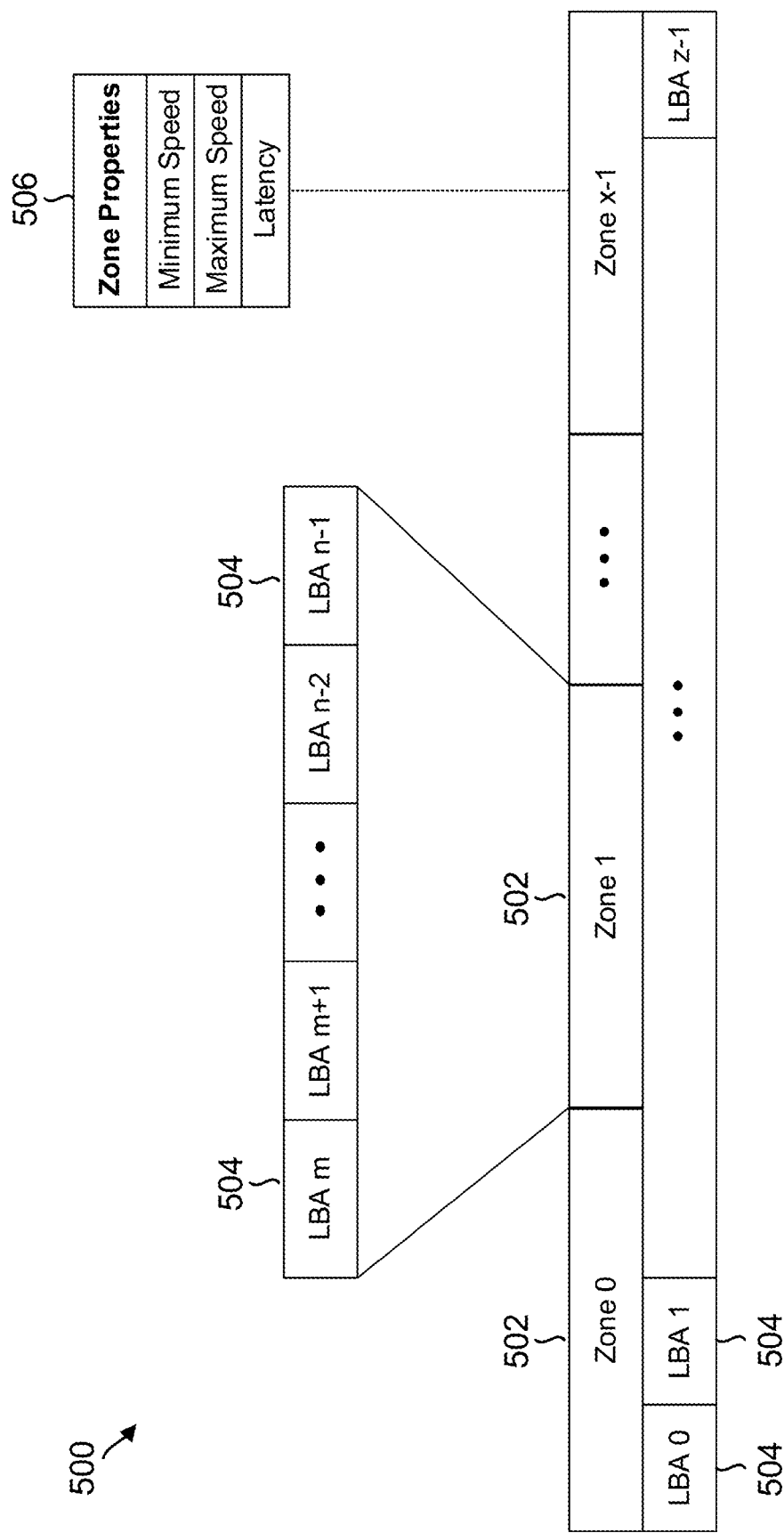
FIG. 5 is a conceptual diagram illustrating an example of an association of zones to groups of logical addresses that is received by the storage device of FIG. 1.

FIG. 5 illustrates a conceptual diagram 500 of an example of zones 502. Each zone 502 is fixed in size and includes a contiguous range of sequential logical addresses 504 in the NVM 110. For instance as illustrated, the NVM 110 may include a total of z LBAs that are divided into x zones, with each zone including a range of n–m sequential LBAs, where z represents the total number of sectors in flash memory, x represents the number of zones, m represents a first LBA in a zone, and n represents a last LBA in the same zone. Each zone may be separately used by the host for storing data associated with one or more applications run by the host. Thus, the host 104 may divide the LBAs into a number of zones depending on the number of applications run by the host.

The host 104 may provide a definition of the zones 502 (e.g. groups of logical addresses 504) to the controller 123. For example, the host 104 may indicate that one group of LBAs, or logical block, is associated with a first zone. that another group of LBAs, or logical block, is associated with a second zone, and so forth. The controller 123 may then map each logical block to one or more physical blocks in the NVM 110. For instance, the controller 123 may map the LBAs associated with the first zone to a first physical block (e.g. one of the blocks 402), the LBAs associated with the second zone to a second physical block (e.g. another of the blocks 402), and so forth. The controller 123 may then write and read data 119 in the blocks 402 associated with the zones 502.

The host 104 may also indicate zone properties 506 to the controller 123, such as a minimum speed expected for data writes in each zone 502, a maximum speed expected for data writes in each zone 502, a latency expected for data writes in each zone 502, or other zone requirements expected by the host 104. The different zone properties may be application-specific. For instance, the host may indicate to the controller 123 that a first zone to be used for storing critical application data requires higher performance speeds (e.g. data write speeds of 150 Mbps at minimum), while a second zone to be used for storing other application data requires lower performance speeds (e.g. data writes of 50 Mbps at minimum). Alternatively, the host may indicate that the zones 502 require similar speeds (e.g. both the first and second zones require data write speeds of 100 Mbps at minimum). The host may indicate these zone requirements when configuring the zones for the controller.

To satisfy specified zone requirements such as minimum and maximum write speeds or latencies for a particular zone, the controller may map the logical addresses 504 associated with each of the zones 502 across different dies 114. For example, if the storage device 102 includes four dies of flash memory, the controller 123 may map a first quarter of the LBAs associated with the zone 502 to one or more blocks 402 in the first die, a second quarter of the LBAs associated with the zone 502 to one or more blocks 402 in the second die, a third quarter of the LBAs associated with the zone 502 to one or more blocks 402 in the third die, and a fourth quarter of the LBAs associated with the zone 502 to one or more blocks 402 in the fourth die. The controller 123 may similarly map other zones defined by the host 104 in one or more other blocks 402 of the same dies 114. Such mapping of zones across the same dies, or sharing of resources between the zones, may allow for the controller 123 to write data to the zones in parallel between the different dies 114.

Figure 6:
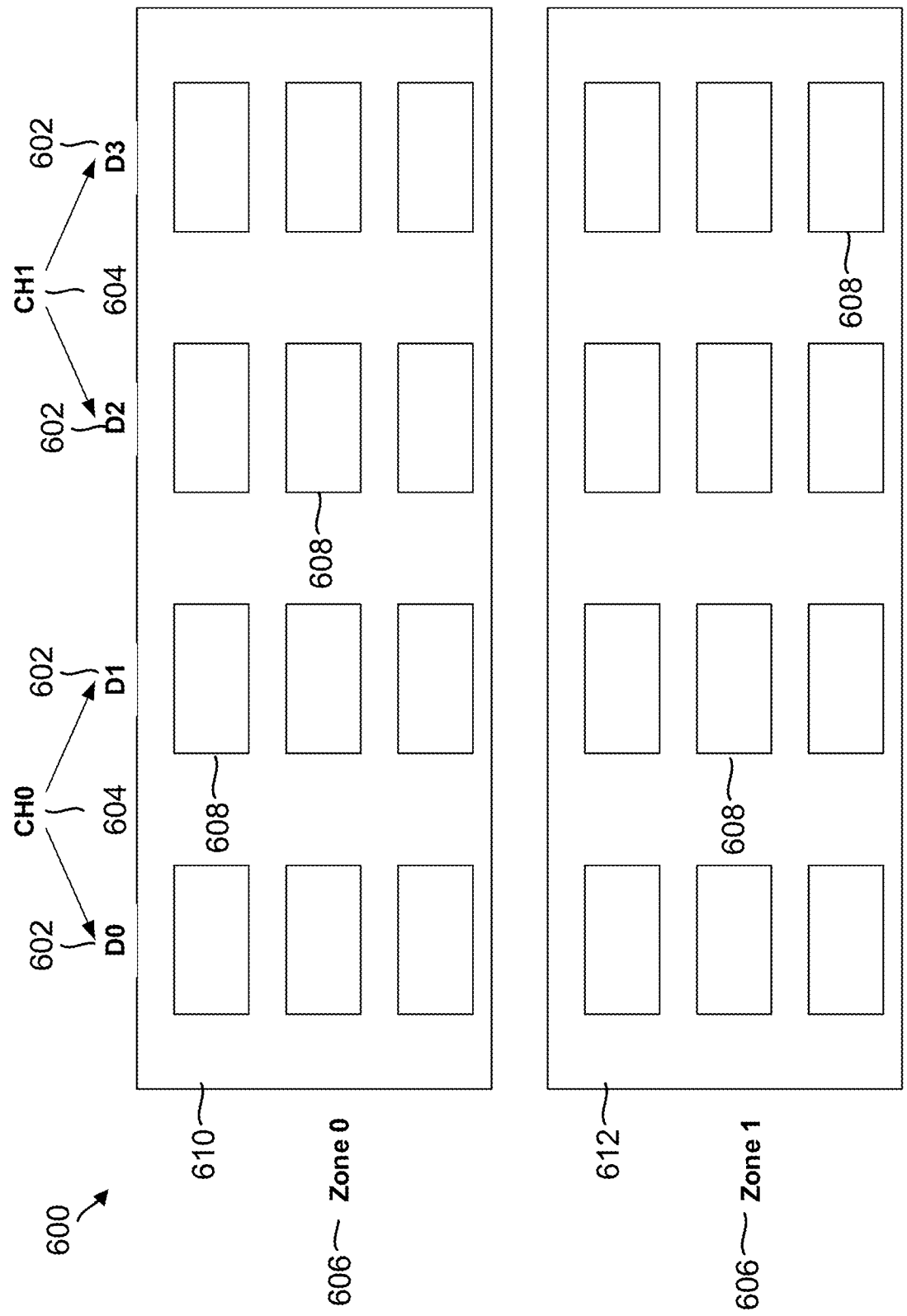
FIG. 6 is a conceptual diagram illustrating an example of shared resources between zones in the storage device of FIG. 1.

FIG. 6 illustrates a conceptual diagram 600 of an example of shared resources (e.g. dies 602 or channels 604) between zones 606. Dies 602 (i.e. D0, D1, D2, and D3) may correspond to dies 114 of FIG. 1, and zones 606 may correspond to zones 502 of FIG. 5. In this example, the controller 123 may communicate with a pair of the dies 602 on a single channel (e.g. D0 and D1 on CH0 and D2 and D3 on CH1), although in other examples additional channels (or dies on each channel) may be included.

Each die 602 may include zone resources 608 (e.g. blocks 402, pages 316, or other resources of memory) in which the controller may write data (e.g. data 119), and the controller may map the logical addresses (e.g. logical addresses 504) associated with zones 606 to the zone resources 608. For example, the host 104 may indicate two zones including respective ranges of logical addresses to the controller, and the controller may map the logical addresses of one of the zones 606 (e.g. Zone 0) to a first group 610 of the zone resources 608 and the logical addresses of another of the zones 606 (e.g. Zone 1) to a second group 612 of the zone resources 608. Thus, Zone 0 and Zone 1 may share the same underlying resources since the first group 610 and second group 612 both include zone resources spanning the same dies 602 or channels 604.

However, when multiple zones 606 share underlying resources (e.g. dies 602 or channels 604 of the storage device 102) such as illustrated in the example of FIG. 6, one zone may cause a starvation effect on other zones, preventing intended zone speeds or latencies expected by host device 104 from being achieved. For example, in a multi-queue depth environment, if the controller 123 receives write commands from host device 104 to write data in the first group 610 of zone resources 608 associated with Zone 0 spanning across multiple dies 602, then the controller may end up utilizing the entire device bandwidth (e.g. all the dies 602 or channels 604) for Zone 0. Yet, if the controller 123 also receives write commands from host device 104 to write data in the second group 612 of zone resources 608 associated with Zone 1, the controller may delay executing these commands until the Zone 0 commands have completed, resulting in higher latencies for completing Zone 1 commands. Thus, the Zone 0 commands may effectively starve Zone 1 commands.

Figure 7:
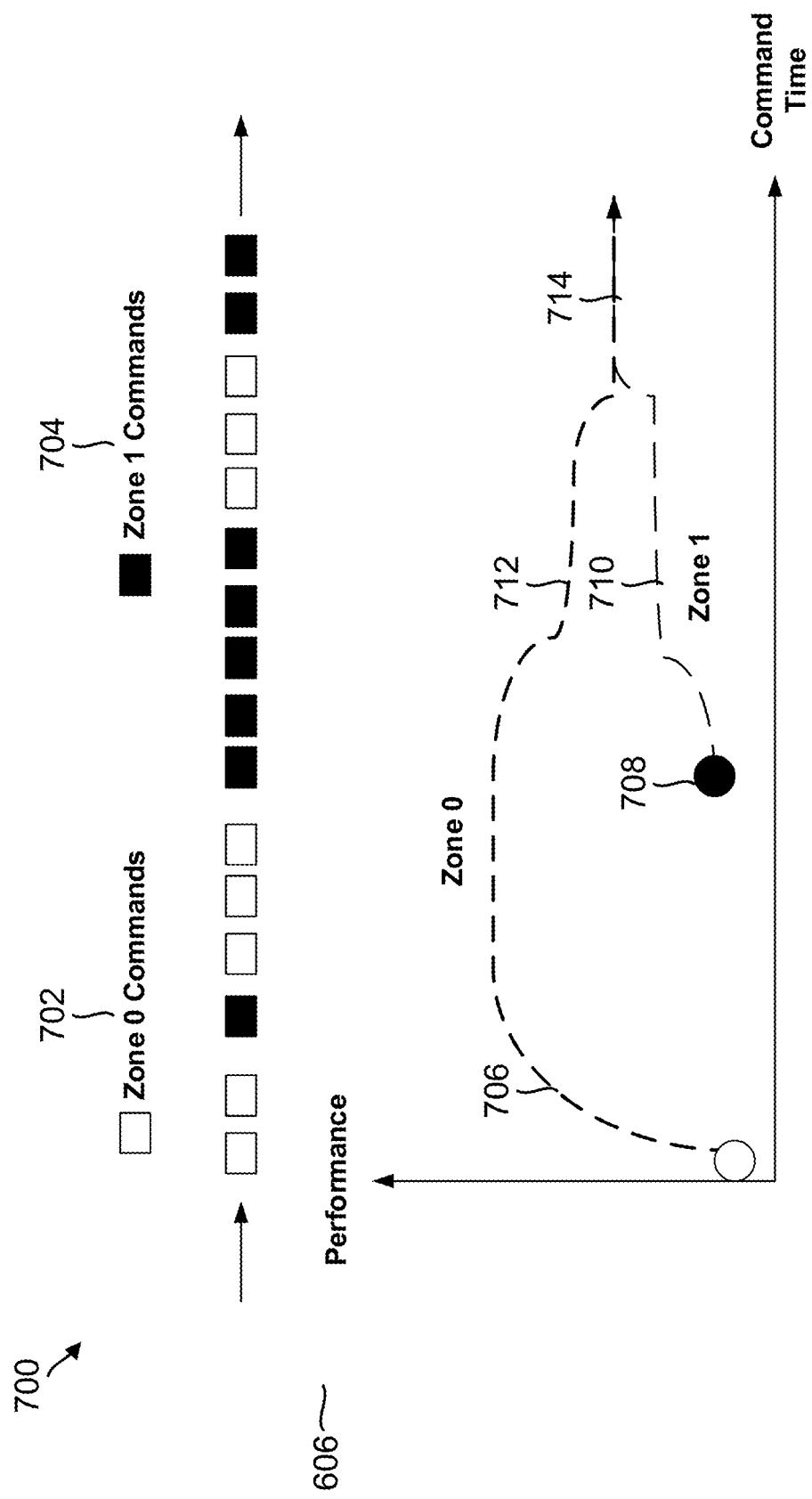
FIG. 7 is a conceptual diagram illustrating a relationship between command performance and time for different zones when resources are shared according to the example of FIG. 6.

FIG. 7 illustrates an example 700 of a relationship between command performance and time for different zones, which illustrates the aforementioned starvation effect when resources are shared as in the example of FIG. 6. In the illustrated example, the controller 123 receives zone 0 commands 702 and zone 1 commands 704 in the order depicted (i.e. two zone 0 commands, one zone 1 command, three zone 0 commands, five zone 1 commands, three zone 0 commands, and two zone 1 commands). Here, the controller receives and processes zone 0 commands 702 first, and therefore the zone 0 commands may initially utilize the full bandwidth of the storage device (e.g. all four dies D0, D1, D2, and D3 of FIG. 6). This result is illustrated at 706 by the rapid increase in performance or write speed of the zone 0 commands. Later in time, when the controller receives the zone 1 commands 704, the controller waits until after the first zone 0 commands are complete before processing a zone 1 command, resulting in higher latencies for executing the zone 1 commands. This result is illustrated at 708 by the delayed appearance of the zone 1 command.

When the zone 1 command 704 eventually begins execution, the zone 1 command may initially utilize minimal bandwidth of the storage device (e.g. one of the dies D0, D1, D2, or D3 of FIG. 6) after the previous zone 0 commands have completed processing. This result is illustrated at 710 by the slow increase in performance or write speed of the zone 1 commands and at 712 by the slow decrease in performance or write speed of the zone 0 commands. For instance, if the zone 1 command only utilizes one die of the storage device (after effectively utilizing zero dies), subsequent zone 0 commands may utilize only three dies of the storage device (after previously utilizing four dies), and thus the performance of the zone 0 commands may decrease. Eventually, as illustrated at 714, the remaining zone 0 and zone 1 commands that follow may both utilize the same number of dies of the storage device (e.g. zone 0 and zone 1 may each use two of the dies D0, D1, D2, and D3 in FIG. 6), resulting in stabilized, equal performance or speeds. If the host expects both zones to have the same zone properties or requirements (e.g. 100 Mbps performance), this expectation may be met after the performances stabilize at 714. However, prior to this point in time, zone 1 commands 704 had lower performance and higher latency than zone 0 commands 702 due to the starvation effect of zone 0 on zone 1, and thus in this example the zone requirements were not met for a substantial period of time.

One approach to address this starvation effect between zones 606 is to dedicate different dies 602 for each zone. In this approach, rather than mapping each zone 606 to all of the dies D0, D1, D2, D3 as described above with respect to FIG. 6, the controller maps each zone to different, dedicated dies for those zones based on zone requirements. FIG. 8 illustrates a conceptual diagram 800 of an example of dedicated resources (e.g. dies 802 or channels 804) between zones 806. Similar to the example of FIG. 6, dies 802 (i.e. D0, D1, D2, and D3) may correspond to dies 114 of FIG. 1, zones 806 may correspond to zones 502 of FIG. 5, and each die 802 may include zone resources 808 (e.g. blocks 402, pages 316, or other resources of memory) in which the controller may write data (e.g. data 119). Moreover, the controller may similarly map the logical addresses (e.g. logical addresses 504) associated with zones 806 to the zone resources 808, for example, by mapping the logical addresses of one of the zones 806 (e.g. Zone 0) to a first group 810 of the zone resources 808 and the logical addresses of another of the zones 806 (e.g. Zone 1) to a second group 812 of the zone resources 808.

However, unlike the example of FIG. 6, where the first group of zone resources associated with Zone 0 and second group of zone resources associated with Zone 1 each span all four dies D0, D1, D2, and D3, here the first group 810 and second group 812 include zone resources in dedicated dies for each zones. For instance, the first group 810 only includes zone resources in D0 and D1 (or CH0), while the second group 812 only includes zone resources in D2 and D3 (or CH1). This approach may allow the controller to ensure that minimum data write speeds are always achievable. For example, assuming that the zones 806 each have minimum write speeds of 100 Mbps defined by the host 104, and assuming each of the dies 802 has a standard write speed of 50 Mbps, the mapping of each zone to two dedicated dies in this example allows each zone to always meet the 100 Mbps minimum write speed unlike the example of FIGS. 6 and 7. However, this approach does not allow the controller 123 to utilize the full potential of the storage device 102 for processing host commands in various zones, since the maximum data write speed is still limited in this approach. For example, by limiting each zone to two dies, the controller may not be able to attain more than 100 Mbps speed for each zone 806, even though the controller may be capable of 200 Mbps speed at its full potential or device bandwidth (based on four dies D0, D1, D2, and D3).

Accordingly, to resolve the starvation effect on zones described above with respect to FIGS. 6 and 7 but without the limitations inherent in dedicating different dies for each zone as described with respect to FIG. 8, in one example, the controller 123 may employ a different approach of prioritizing received commands based on essential and optional resources. As described above, the controller 123 may maintain essential and optional resources for each zone (e.g. zone 502) and re-prioritize commands depending on whether a zone is in an over-utilization state or in an under-utilization state. The controller 123 may determine the essential resources based on zone properties (e.g. zone properties 506), such as the minimum or maximum speed or latency committed by a zone.

Figure 9:
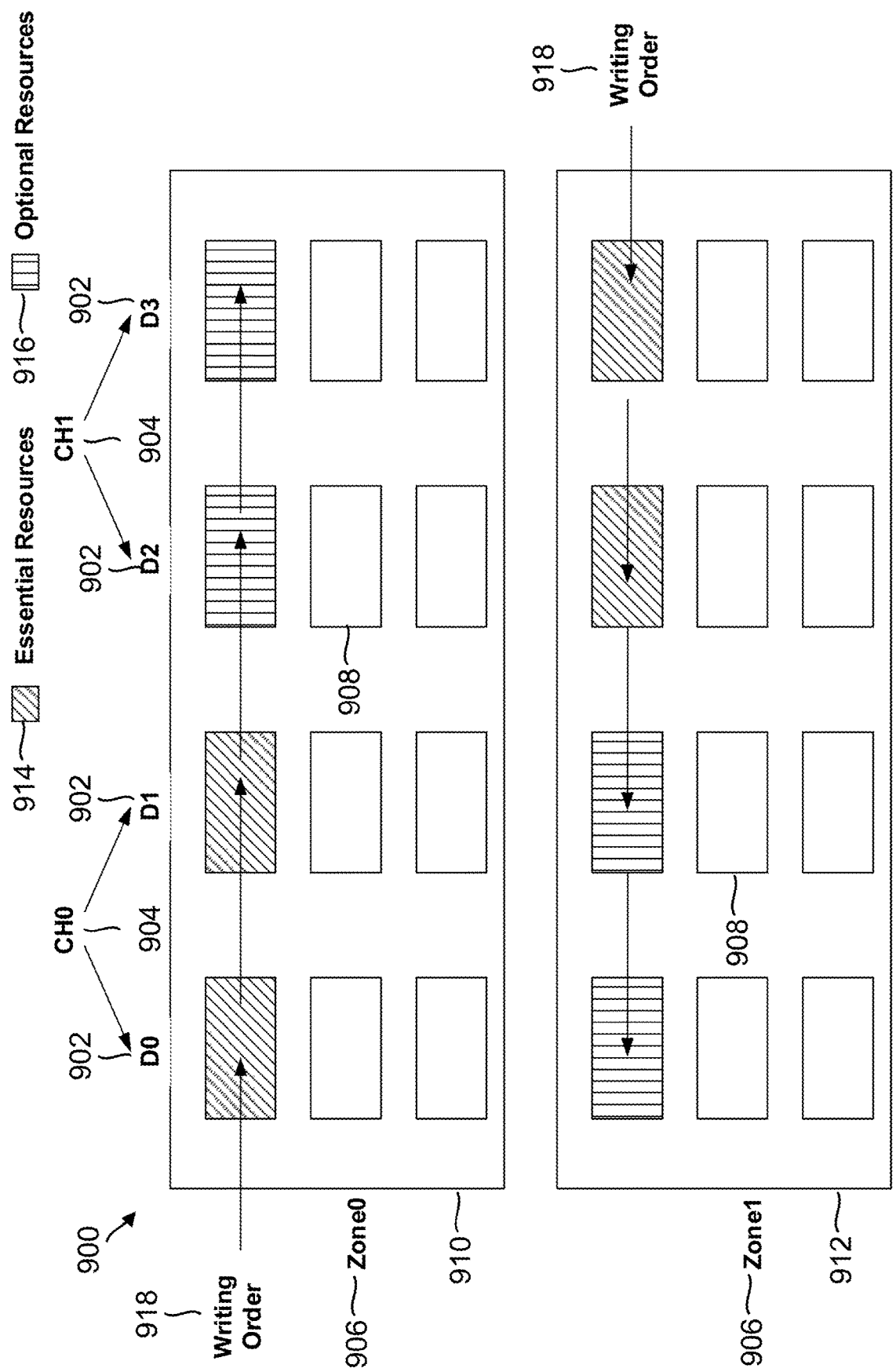
FIG. 9 is a conceptual diagram illustrating an example of essential and optional resources for different zones in the storage device of FIG. 1.

FIG. 9 illustrates a conceptual diagram 900 of an example of shared resources (e.g. dies 902 or channels 904) between zones 906 which are allocated between essential and optional resources. Similar to the example of FIG. 6, dies 902 (i.e. D0, D1, D2, and D3) may correspond to dies 114 of FIG. 1, zones 906 may correspond to zones 502 of FIG. 5, and each die 902 may include zone resources 908 (e.g. blocks 402, page 316, or other resources of memory) in which the controller may write data (e.g. data 119). Moreover, the controller may similarly map the logical addresses (e.g. logical addresses 504) associated with zones 906 to the zone resources 908, for example, by mapping the logical addresses of one of the zones 906 (e.g. Zone 0) to a first group 910 of the zone resources 908 and the logical addresses of another of the zones 906 (e.g. Zone 1) to a second group 912 of the zone resources 908.

Additionally, the first group of zone resources associated with Zone 0 and second group of zone resources associated with Zone 1 each similarly span all four dies D0, D1, D2, and D3. However, unlike the example of FIG. 6, here the controller 123 allocates zone resources in different dies 902 as essential resources 914 and optional resources 916 based on the zone properties (e.g. zone properties 506). The essential resources 914 may serve to satisfy the zone requirements or properties indicated by the host 104 for each zone 906, while the optional resources 916 may be used to provide faster write speeds or lower latencies than the host expects in its zone requirements.

In one example, assume the zone properties indicate the minimum zone speed of each zone 906 should be 100 Mbps, and that each die 902 provides 50 Mbps of data write speed. In such case, in order to meet these zone requirements for both zones, the controller 123 may allocate zone resources 908 in two of the dies 902 (or one of the channels 904) as essential resources 914 for one of the zones 906 (e.g. D0 and D1 or CH0 for Zone 0), and zone resources 908 in the remaining two of the dies 902 (or the other of the channels 904) as essential resources 914 for the other of the zones 906 (e.g. D2 and D3 or CH1 for Zone 1). This allocation is illustrated in the example of FIG. 9. In other examples, zone resources 908 in any number of dies 902 or channels 904 may be allocated as essential resources 914 for a zone based on the zone properties indicated by the host 104. For example, if the zone properties alternatively indicate zone 0's minimum speed should be 150 Mbps and zone 1's minimum speed should be 50 Mbps, the controller 123 may allocate zone resources 908 in three of the dies 902 (e.g. D0, D1, and D2) as essential resources 914 for zone 0 and zone resources 908 in one of the dies 902 (e.g. D3) as essential resources 914 for zone 1. After the essential resources 914 are allocated in dies 902 or channels 904 based on the zone properties as described above, zone resources 908 in remaining dies or channels that are not allocated as essential resources 914 for a zone may be allocated as optional resources 916 for that zone. Thus, as illustrated in the example of FIG. 9, if the controller 123 allocates zone resources 908 in D0 and D1 as essential resources 914 for zone 0 and zone resources 908 in D2 and D3 as essential resources 914 for zone 1, the controller may complementarily allocate zone resources 908 in D2 and D3 as optional resources 916 for zone 0 and zone resources in D0 and D1 as optional resources 916 for zone 1.

Thus, one zone's essential resources 914 and another zone's optional resources 916 may share the same die 902 or channel 904 as illustrated in FIG. 9. As a result, the controller 123 may not write data to one zone's essential resources 914 simultaneously to another zone's optional resources 916. Therefore, if the controller is currently executing commands in the optional resources 916 of one zone and if commands for another zone are later received for execution, the controller may release the one zone's optional resources (e.g. stops writing to the optional resources for that zone) in order to use the other zone's essential resources.

As an example of operation, the controller 123 may first write data to each zone 906 in essential resources 914 prior to optional resources 916, as indicated by writing order 918. Thus, when the controller receives commands from the host 104 to write data in both zones, the controller may initially write data to the essential resources 914 of each zone in parallel. If the controller later stops processing commands for one of the zones (there are none left in a submission queue for that zone currently), the controller may begin to write data in the optional resources 916 for the other zone. For example, after writing data to the essential resources of both zones 0 and zone 1 in response to host commands, the controller may determine that there are no zone 1 commands currently pending, and therefore the controller may begin to write data to the optional resources 916 of zone 0. In such case, zone 0 may be in an over-utilization state. If the controller later receives additional zone 1 commands for execution, the essential resources 914 for zone 1 are currently being used as optional resources 916 for zone 0, and thus zone 1 may be in an under-utilization state. As a result, the controller may stop writing data to the optional resources 916 of zone 0 and instead write data to the essential resources 914 of zone 1. If later on the controller determines that there are no zone 0 commands currently pending, the controller may begin to write data to the optional resources 916 of zone 1. In such case, zone 1 may be in an over-utilization state. If the controller later receives additional zone 0 commands for execution, the essential resources 914 for zone 0 are currently being used as optional resources 916 for zone 1, and thus zone 0 may be in an under-utilization state. As a result, the controller may stop writing data to the optional resources 916 of zone 1 and instead write data to the essential resources 914 of zone 0. Thus, execution of commands may be balanced between different zones according to zone utilization states based on the essential and optional resources.

Moreover, based on the essential resources 914, the controller 123 may reshuffle commands for optimum utilization of zones and minimal zone latencies. In one example, the controller 123 may segregate commands between different zones and prioritize data writes to the essential resources based on tracked zone utilization states. For instance, when the controller 123 receives several commands for different zones, the controller may initially segregate the commands and issue the commands in parallel for execution in all zones in interleaved fashion such that the essential resources are utilized initially. That is, reshuffled commands which include data occupying the essential resources of each zone may be issued first (in advance of other reshuffled commands). Afterwards the controller may track the utilization state of each zone and distribute the load (the processing of write commands) between the zones based on the utilization states.

Figure 10:
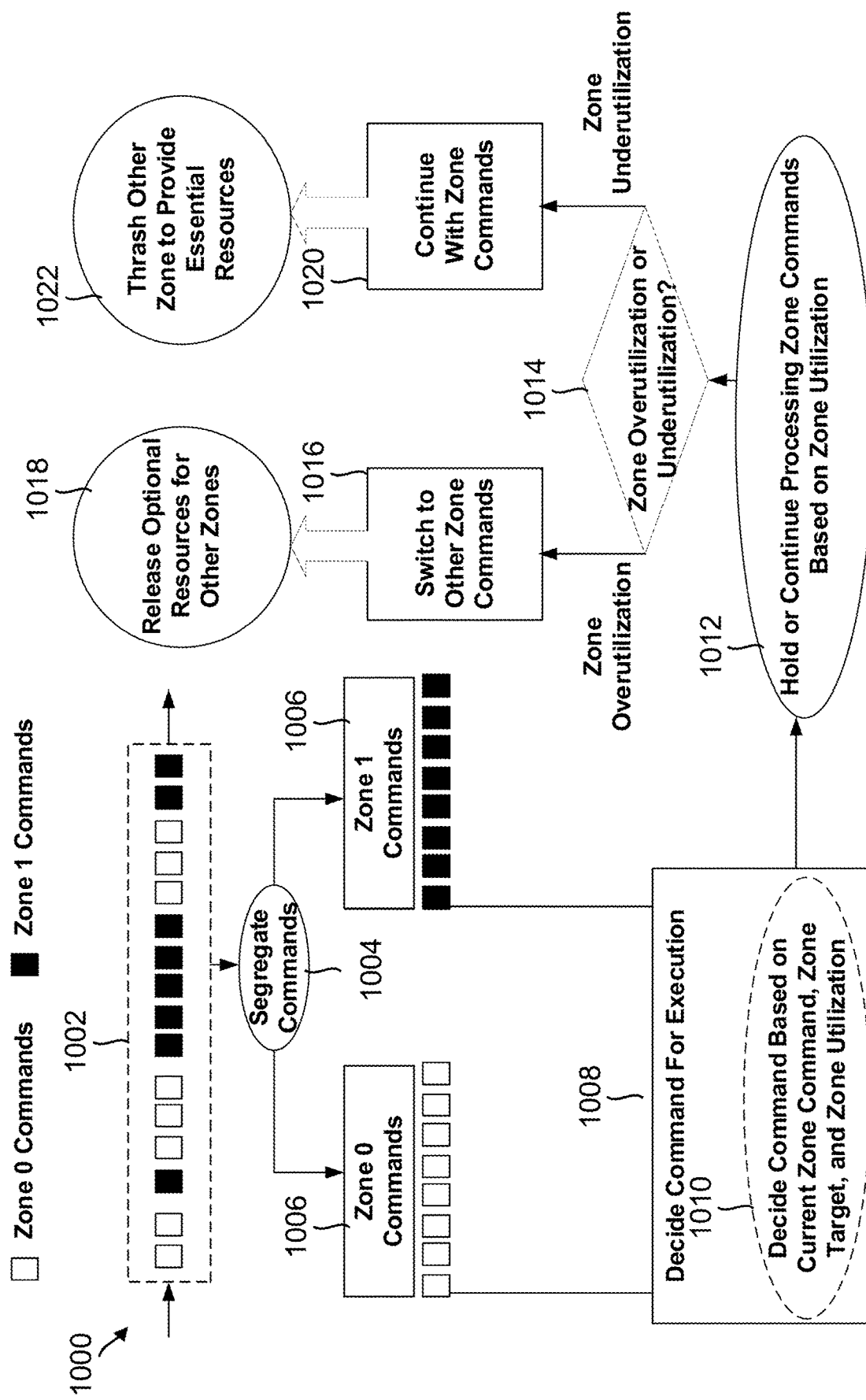
FIG. 10 is a flow chart illustrating a method for prioritizing commands in the storage device of FIG. 1 based on command segregation and zone utilization.

FIG. 10 illustrates an example of a method 1000 for prioritizing commands (e.g. zone 0 commands and zone 1 commands) based on command segregation and zone utilization as described above. Before segregating the commands, the controller may first identify the commands currently pending within a window 1002 of predetermined size. For example, the controller 123 may identify that the predetermined size of window 1002 includes 16 total commands, and therefore the controller may identify in a submission queue the next 16 commands that are pending execution. For instance, as illustrated in the example of FIG. 10, the controller may identify that the next 16 commands include, in the following order: two zone 0 commands, one zone 1 command, three zone 0 commands, five zone 1 commands, three zone 0 commands, and two zone 1 commands. In other examples, the controller 123 may identify any number of commands associated with any number of zones in any order based on other predetermined window sizes. For example, the window size may correspond to the host command queue depth (e.g. 128 or 256 total commands), and thus the controller may identify up to a total of 256 pending zone 0 and zone 1 commands (or other zone commands).

After the controller 123 identifies the commands pending in the window 1002, at 1004, the controller segregates the commands between the zones. For instance, in the illustrated example where the controller identifies 16 total commands for zone 0 and zone 1, half of the commands may be for zone 0 while the other half of the commands may be for zone 1. Therefore the controller 123 may segregate the commands between two zones into separate lists 1006 of eight zone 0 and zone 1 commands each accordingly. In other examples, any number of commands or zones may be segregated into different lists 1006 accordingly.

Next, at 1008, the controller 123 decides which command to select for execution in a particular zone. To mitigate the starvation effect described above for any zone, the controller may initially select commands that include data to be written to the essential resources of each zone. For instance, referring to FIG. 9 where zone resources 908 of dies D0 and D1 are configured as the essential resources 914 of zone 0, the controller 123 may select one of the zone 0 commands from its respective list 1006 that includes data to be written in those zone resources. Similarly, where zone resources 906 of dies D2 and D3 are configured as the essential resources 914 of zone 1, the controller may select one of the zone 1 commands from its respective list 1006 that includes data to be written in those zone resources. The controller may select the different zone commands from the respective lists 1006 in an interleaved manner (e.g. zone 0, zone 1, zone 0, zone 1, etc.) and write the data to the essential resources in parallel such that both zones may be written with minimal latency. The utilization of each zone may thus remain balanced based on the essential resources 914.

Moreover, when deciding which command to select, at 1010, the controller 123 may base its decision based on the current zone commands, the zone target (e.g. minimum speed or other zone properties), and the current zone utilization. For example, as more commands are received from the host, identified in window 1002, and segregated into lists 1006 accordingly, the controller may determine that zone 1 does not have any currently pending commands. In such case, the controller 123 may select a zone 0 command from the respective list 1006 that includes data to be written not only in zone 0's essential resources 914 but also zone 0's optional resources 916. Accordingly, the controller may identify zone 0 to be in an over-utilization state at this time. Subsequently, if zone 1 commands are later received, the controller 123 may decide that zone 1 is in an under-utilization state and that zone 1's target (e.g. its minimum speed or latency) may not be met if zone 0 continues to remain in the over-utilization state (i.e. zone 0 would starve zone 1). To prevent this effect, the controller may decide at 1010 to select a zone 1 command from the respective list 1006 that includes data to be written in zone 1's essential resources 914. The controller may operate in reverse if zone 1 is later identified to be in an over-utilization state and zone 0 in an under-utilization state. Thus, balance between zone commands may be maintained.

At 1012, the controller 123 may consider zone utilization when deciding a command to select (e.g. at 1008 and 1010). For instance, the controller may hold (or refrain from executing) zone commands in optional resources 916, or continue to process zone commands in essential resources 914 (or optional resources) based on the zone utilization identified at 1010. In one example, the controller may determine at 1014 that a zone is in an over-utilization state. In such case, the controller may refrain from executing further commands for that zone to allow commands in other zones to be processed. For instance, at 1016, the controller may switch or move to process other zone commands, and at 1018, the controller may release the optional resources of one zone to allow processing of the other zone commands. In another example, the controller may determine at 1014 that a zone is in an under-utilization state. In such case, at 1020, the controller may continue to process commands from that zone, and at 1022, the controller may thrash the other zone (e.g. change the priority order of the queued commands to the optional resources of the other zone) to enable the processed commands to be executed in the current zone's essential resources. Thus, in the example described above with respect to FIG. 9, if the controller 123 identifies zone 0 to be in an over-utilization state, the controller may refrain from executing zone 0 commands that include data to be written in zone 0's optional resources 916 in favor of executing zone 1 commands that include data to be written in zone 1's essential resources 914. Similarly, if the controller 123 identifies zone 1 to be in an under-utilization state, the controller may continue to execute zone 1 commands including data to be written in zone 1's essential resources 914 and possibly zone 1's optional resources 916.

Furthermore, the controller 123 may minimize zone latencies by reshuffling commands for execution in an interleaved fashion. For instance, the controller may provide reduced zone latencies by distributing the load (e.g. processed write commands) initially in the essential resources (e.g. dies or channels) of each zone in an interleaved manner. The controller may dynamically change the priority order of the commands such that commands including data to be written in the essential resources of a zone have the highest priority. The controller may also change the priority order based on the data length of the various commands. Examples of such command reshuffling are described below with respect to FIGS. 11 and 12.

Figure 11:
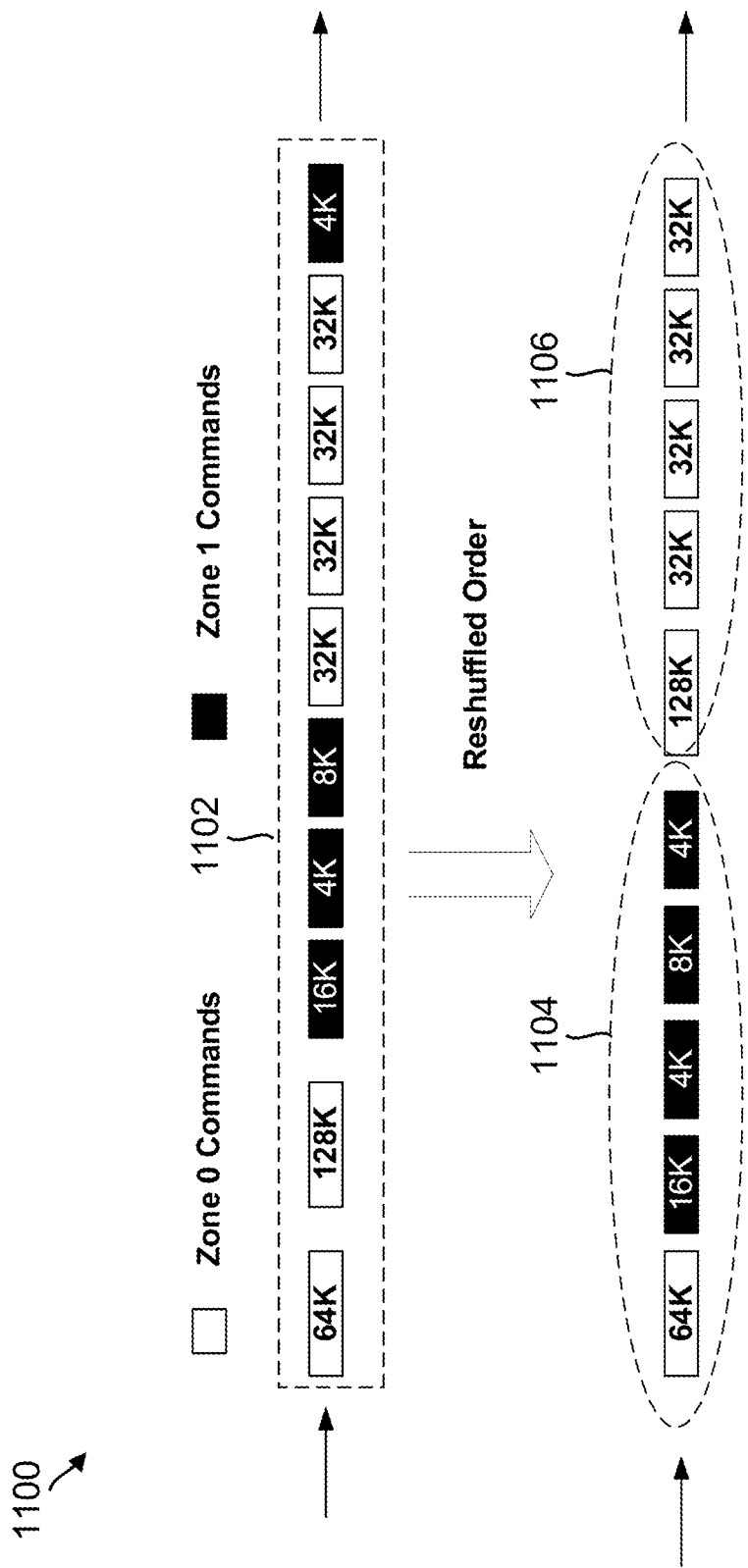
FIG. 11 is a conceptual diagram illustrating an example of command prioritization in the storage device of FIG. 1 based on essential resource allocation and data length.

FIG. 11 illustrates an example 1100 of command prioritization based on essential resource allocation and data length. In this example, zone 0's essential resources are assumed to handle 96 KB of data writes in parallel, while zone 1's essential resources are assumed to handle 32 KB of data writes in parallel. These limits may be present in the example of FIG. 9, where zone resources 908 in dies D0, D1, and D2 are allocated as essential resources 914 for zone 0 and zone resources 908 in die D3 are allocated as essential resources for zone 1, assuming that the controller may write 32 KB to a die at one time. In other examples, other essential resource limits (besides 96 KB and 32 KB for zone 0 and zone 1 respectively) may be determined based on the number of dies, the amount of data handled by each die, and zone requirements.

The controller 123 may initially identify the commands received from the host within a window 1102 of predetermined size (e.g. corresponding to window 1002). For instance, as illustrated in the example of FIG. 11, the controller 123 may identify from the window 1102 that a zone 0 command for 64 KB of data was first received, followed by a zone 0 command for 128 KB of data, followed by a zone 1 command for 16 KB of data, a zone 1 command for 4 KB of data, a zone 1 command for 8 KB of data, four zone 0 commands for 32 KB of data, and a zone 1 command for 4 KB of data. In other examples, the controller may identify other orders of commands and data lengths for zones 0 and 1 (or other zones) in window 1102.

After identifying the commands in window 1102, the controller 123 may reshuffle the commands into different command groups 1104, 1106 based on their data lengths and the essential resource limits (e.g. 96 KB or 32 KB as described above). For instance, the controller may prioritize those commands that include data to be written in the essential resources for each zone first within command group 1104, leaving the commands that may be written to optional resources for each zone last within command group 1106, and the controller may execute the reshuffled commands in interleaved fashion. For example, as illustrated in FIG. 11, the controller may reshuffle the four zone 1 commands (16 KB, 4 KB, 8 KB, and 4 KB) to be processed immediately after the 64 KB zone 0 command (together in command group 1104) since the total data lengths of these zone commands fit within the respective 96 KB and 32 KB limit of each zone. As a result, the controller may write the data associated with the commands in command group 1104 simultaneously to the essential resources of zones 0 and 1.

In contrast, since the remaining commands if executed in command group 1104 would exceed the essential resource limit of their respective zone, these subsequent commands are categorized in command group 1106. For example, the subsequent 128 KB zone 0 command along with the subsequent 32 KB zone 0 commands may be reshuffled into command group 1106 for processing after the other commands in command group 1104. Thus, once the commands in command group 1104 are written in parallel to the essential resources, the controller may begin to process the commands in command group 1106. However, since at this time all the commands in command group 1106 are for a single zone (i.e. no zone 1 commands are currently pending), the controller may write the data associated with these commands not only in the essential resources for that zone (i.e. zone 0) but also in the optional resources for that zone. Thus, zone 0 may enter an over utilization state at the time commands in command group 1106 are processed, since the 128 KB and four 32 KB commands may be written in parallel to zone 0's essential and optional resources until zone 1 commands are later received. Once subsequent zone 1 commands are received, the controller may thrash zone 0 to allow for these zone 1 commands to be processed in the essential resources of zone 1, as described above with respect to FIG. 10.

Figure 12:
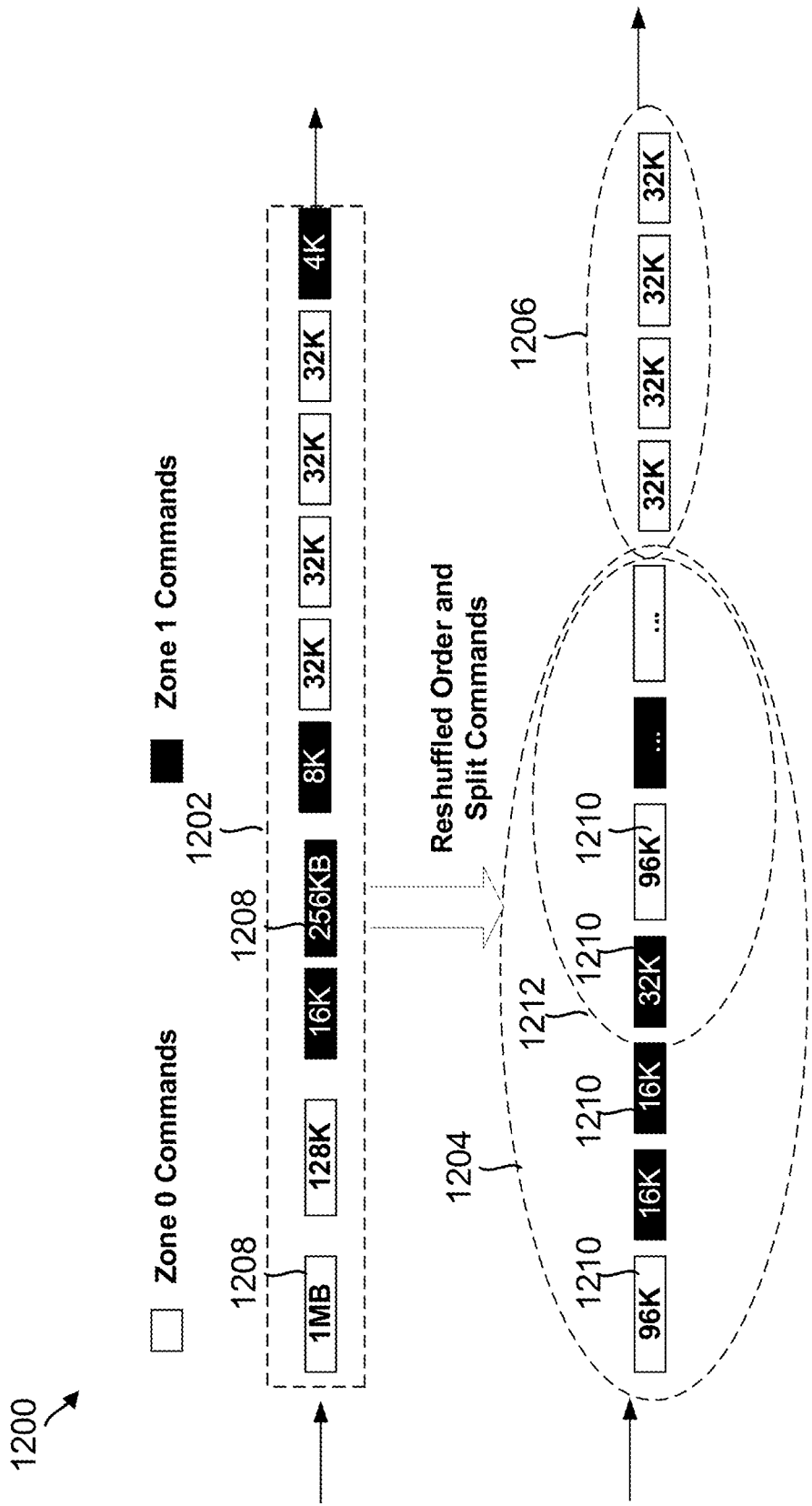
FIG. 12 is a conceptual diagram illustrating another example of command prioritization in the storage device of FIG. 1 based on essential resource allocation and split data lengths.

FIG. 12 illustrates another example 1200 of command prioritization based on essential resource allocation and data length. Similar to the example of FIG. 11, in this example zone 0's essential resources are assumed to handle 96 KB of data writes in parallel, while zone 1's essential resource are assumed to handle 32 KB of data writes in parallel (although other essential resource limits may be assumed in other examples). The controller 123 may also identify the commands received from the host within a window 1202 of predetermined size (e.g. corresponding to window 1002). However, in contrast to the example of FIG. 11, various commands identified in window 1202 may include larger data lengths than those in the example of FIG. 11. For instance, in this example, the controller may identify from the window 1202 that a zone 0 command for 1 MB of data was first received, followed by a zone 0 command for 128 KB of data, followed by a zone 1 command for 16 KB of data, a zone 1 command for 256 KB of data, a zone 1 command for 8 KB of data, four zone 0 commands for 32 KB of data, and a zone 1 command for 4 KB of data. In other examples, the controller may identify other orders of commands and data lengths for zones 0 and 1 (or other zones) in window 1202.

After identifying the commands in window 1202, the controller may reshuffle the commands into different command groups based on their data lengths and the essential resource limits. For instance, the controller may prioritize those commands that include data to be written in the essential resources for each zone first within command group 1204, leaving the commands that may be written to optional resources for each zone last within command group 1206, and execute the commands in interleaved fashion, similar to the example of FIG. 11. However, unlike the example of FIG. 11 where large commands exceeding the essential resource limit of their respective zone are immediately categorized in the latter command group (e.g. command group 1106), in this example, the controller 123 may split large commands 1208 into portions 1210 that are sized to fit within the essential resource limits of their respective zones and thus may be categorized in command group 1204. For example, as illustrated in FIG. 12, the controller may split the 1 MB zone 0 command into various 96 KB commands to accommodate the 96 KB essential resource limit for zone 0 and the 256 KB zone 1 command into 16 KB and 32 KB commands to accommodate the 32 KB essential resource limit for zone 1. The controller may then reshuffle the split commands such that the commands are processed in interleaved fashion (e.g. zone 1, zone 0, zone 1, zone 0, etc., as represented by 1212). For example, the controller may initially write 96 KB of data to the allocated essential resources for zone 0 and 32 KB of data to the allocated essential resources for zone 1 in parallel, and the controller may continue writing 96 KB and 32 KB of data in parallel to the essential resources of zone 0 and zone 1 in an interleaved manner as illustrated at 1212 to provide balanced handling between the zones and optimal utilization.

Afterwards, once the commands in command group 1204 are written in parallel to the essential resources, the controller may begin to process the commands in command group 1206. However, since at this time all the commands in command group 1206 are for a single zone (i.e. no zone 1 commands are currently pending), the controller may write the data associated with these commands not only in the essential resources for that zone (i.e. zone 0) but also in the optional resources for that zone. Thus, zone 0 may enter an over utilization state at the time commands in command group 1206 are processed, similar to the example of FIG. 11. Once subsequent zone 1 commands are received, the controller may thrash zone 0 to allow for these zone 1 commands to be processed in the essential resources of zone 1, as previously described.

Figure 13:
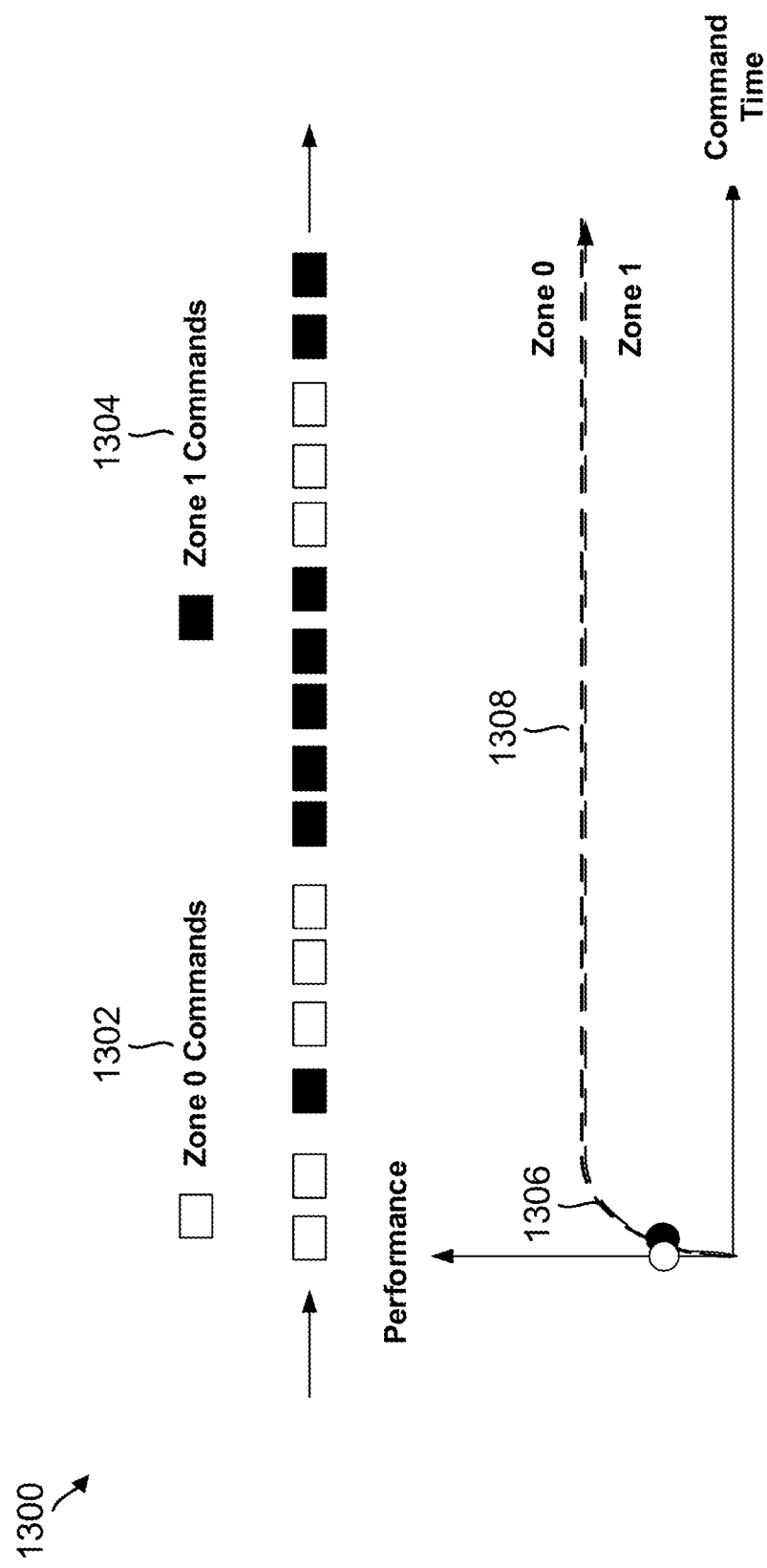
FIG. 13 is a conceptual diagram illustrating a relationship between command performance and time for different zones when resources are shared according to the example of FIG. 9.

FIG. 13 illustrates an example 1300 of a relationship between command performance and time for different zones, which illustrates resolution of the starvation effect between zones when resources are shared as in the example of FIG. 9. In the illustrated example, the controller 123 receives zone 0 commands 1302 and zone 1 commands 1304 in the order depicted (i.e. two zone 0 commands, one zone 1 command, three zone 0 commands, five zone 1 commands, three zone 0 commands, and two zone 1 commands), similar to that of FIG. 7. However, in contrast to the example of FIG. 7 where the zone 0 commands initially utilize the full bandwidth of the storage device at the expense of the latency of the zone 1 commands, here the controller 123 initially executes both zone 0 commands 1302 and zone 1 commands 1304 in the essential resources in parallel as described above. This result is illustrated at 1306 by the rapid increase in performance or write speed of both the zone 0 commands 1302 and zone 1 commands 1304, where reduced latency of the zone 1 commands 1304 may result compared to the example of FIG. 7. For instance, the zone 0 and zone 1 commands may initially both utilize the same number of dies of the storage device (e.g. zone 0 and zone 1 may each use two of the dies D0, D1, D2, and D3 in FIG. 9), resulting in stabilized, equal performance or speeds as illustrated at 1308. Thus, if the host expects both zones to have the same zone properties or requirements (e.g. 100 Mbps performance), this expectation may be met shortly after the zone 0 and zone 1 commands begin execution in stark contrast to the example of FIG. 7.

Figure 14:
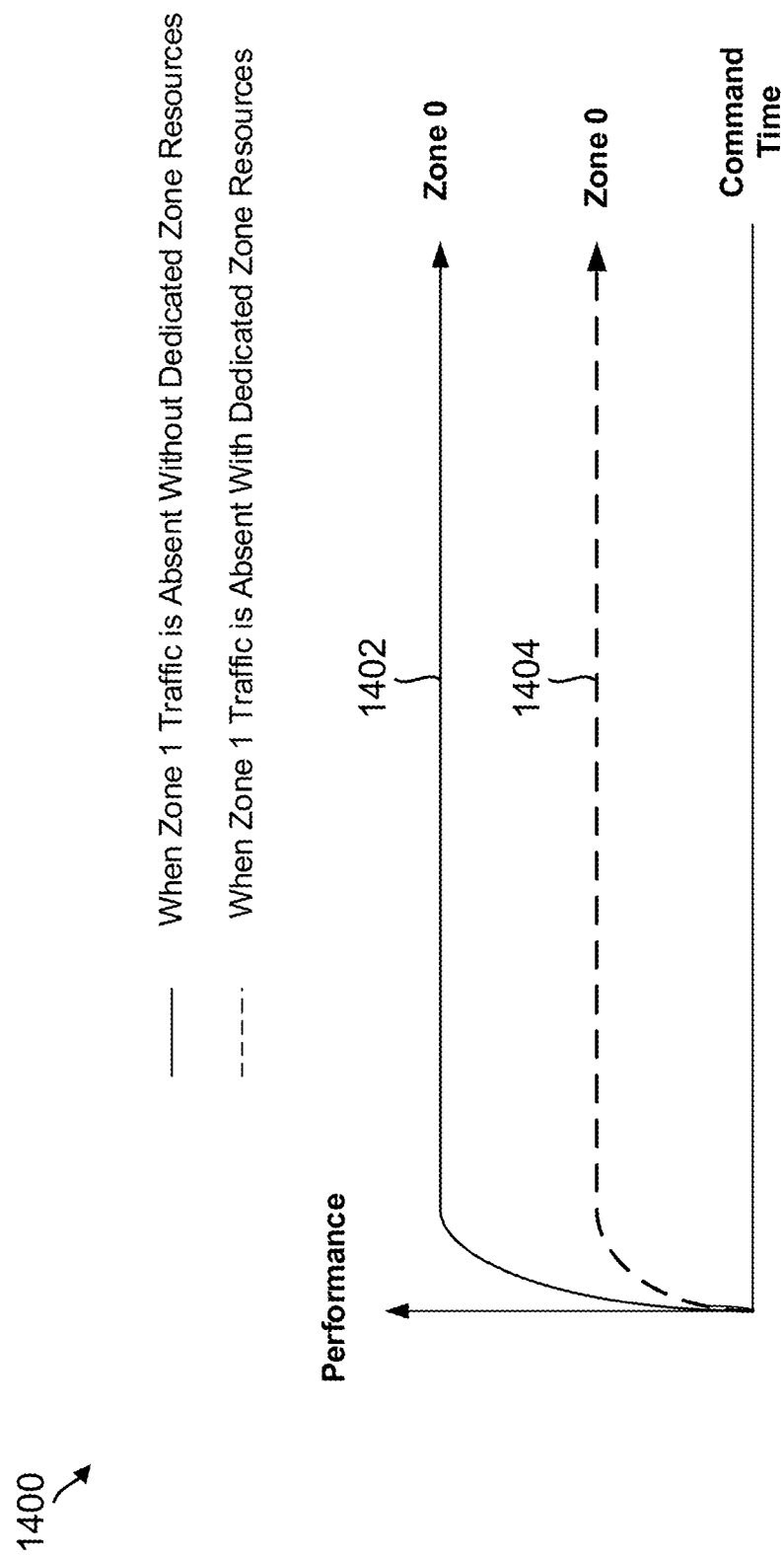
FIG. 14 is a conceptual diagram illustrating a difference in relationship between command performance and time for different zones when resources are shared according to the examples of FIGS. 8 and 9.

Additionally, in contrast to the example of FIG. 8 with dedicated dies, the example of FIG. 9 allows the full bandwidth of the storage device (e.g. all the dies) to be used to achieve maximum performance of one zone's commands in the absence of other zones' commands. FIG. 14 illustrates an example 1400 of a difference in relationship between command performance and time for different zones when resources are shared between the examples of FIGS. 8 and 9. Referring to the example of FIG. 9, zone 0 may be dynamically switched to an over-utilization state in the absence of zone 1's commands, and thus data may be written to both essential resources 914 and optional resources 916 for zone 0 in all of the dies D0, D1, D2, and D3. This result is illustrated in FIG. 14 at 1402 by the rapid increase in performance or write speed of zone 0 commands to a maximum level (e.g. 200 Mbps in the case of four dies). In contrast, if dedicated resources are used such as described above with respect to FIG. 8, then even when there are no zone 1 commands pending, the controller may only write data to zone resources 808 for zone 0 in dedicated dies D0 and D1 (but not D2 and D3), which may equate to only half the total device bandwidth. This result is illustrated in FIG. 14 at 1404 by the smaller performance or write speed of zone 0 commands to half of the maximum level (e.g. only 100 Mbps at most). Thus, the controller may provide improved performance or throughput of the storage device based on command reshuffling, essential and optional resources, and zone utilization states as described above with respect to FIGS. 9-12 in comparison to approaches using dedicated resources such as described above with respect to FIG. 8.

Figure 15:
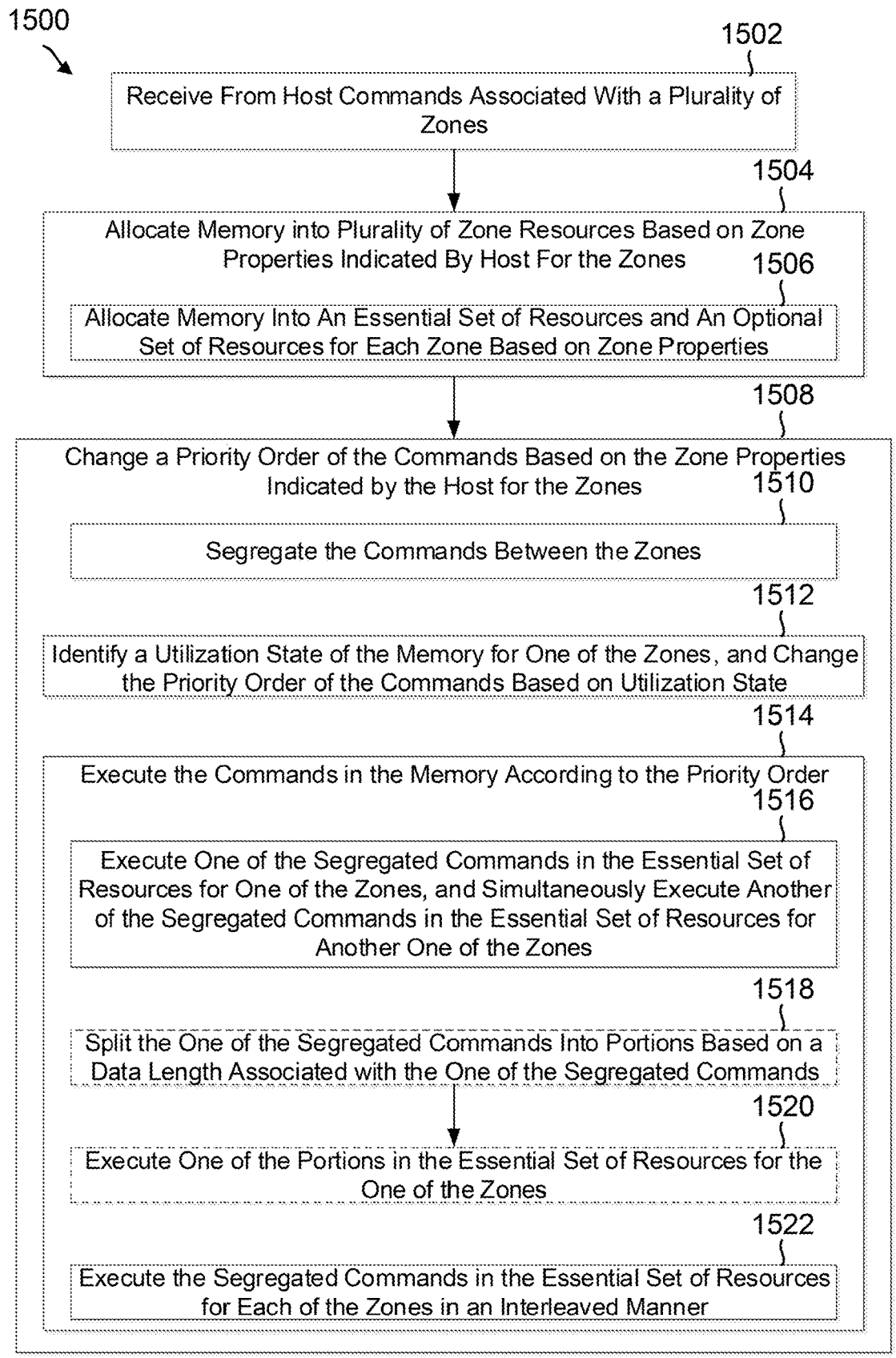
FIG. 15 is a flow chart illustrating a method for prioritizing commands between zones to reduce command latencies, as performed by the storage device of FIG. 1.

FIG. 15 illustrates an example flow chart 1500 of a method for prioritizing commands between zones to reduce command latencies. For example, the method can be carried out in a storage device 102 such as the one illustrated in FIG. 1. Each of the steps in the flow chart can be controlled using the controller as described below (e.g. controller 123), or by some other suitable means. Optional aspects are illustrated with dashed lines.

As represented by block 1502, the controller may receive from a host commands associated with a plurality of zones. For example, referring to FIGS. 1, 2, and 5, the controller 123 may receive from a host 104 commands to write data in a plurality of zones 502 of the NVM 110. The commands may include logical addresses 208 that fall within the logical addresses 504 associated with or defined for the zones 502.

As represented by block 1504, the controller may allocate a memory into a plurality of zone resources based on zone properties indicated by the host for the zones. For example, as represented by block 1506, the controller may allocate the memory into an essential set of resources and an optional set of resources for each zone based on the zone properties. For instance, referring to FIGS. 1, 3-5, and 9, the controller 123 may allocate the NVM 110 into a plurality of zone resources 908 (e.g. blocks 402, pages 316, or other resources of memory) based on zone properties 506 indicated by the host 104 for the zones 502, 906, as described above with respect to FIGS. 5 and 9. The zone properties 506 may include at least one of a minimum speed associated with each zone, a maximum speed associated with each zone, or a requested latency associated with each zone. The controller may allocate the memory (e.g. zone resources 908 in dies D0, D1, D2, D3) into an essential set of resources (e.g. essential resources 914) and an optional set of resources (e.g. optional resources 916) for each zone 906 based on the zone properties 506, as described above with respect to FIG. 9.

As represented by block 1508, the controller may change a priority order of the commands based on the zone properties indicated by the host for the zones. For instance, referring to FIGS. 1, 5, and 10-12, even though the controller may receive zone 0 commands and zone 1 commands in a specified order as illustrated in FIGS. 10-12, the controller may reshuffle or re-prioritize the commands based on the zone properties 506 indicated by the host 104 for the zones (e.g. based on zone target and zone utilization as described with respect to FIG. 10 and based on essential and optional resources as described above with respect to FIGS. 11 and 12).

As an example, as represented by block 1510, the controller may segregate the commands between the zones. For instance, referring to FIG. 10, at 1004, the controller 123 may segregate commands identified in a window 1002 into respective lists 1006 corresponding to the various zones associated with each command. Moreover, as represented by block 1512, the controller may identify a utilization state of the memory for one of the zones, and change the priority order of the commands based on the utilization state for the one of the zones. For instance, referring to FIG. 10, the controller may determine at 1014 whether a current zone is in an over-utilization state or an under-utilization state, and the controller may at 1016 switch to other zone commands (or continue processing zone commands at 1018) based on the determination at 1014.

The utilization state for the one of the zones may comprise an over-utilization state when the commands associated with the one of the zones are executed in the optional set of resources for the one of the zones. For instance, referring to FIGS. 9, 11 and 12, zone 0 may be in an over-utilization state when zone 0 commands are executed in the optional resources 916 configured for zone 0 (e.g. the commands are within command group 1106 or 1206 of FIG. 11 or 12). Alternatively, the utilization state for the one of the zones may comprise an under-utilization state when the commands associated with another one of the zones are executed in the essential set of resources for the one of the zones. For instance, referring to FIGS. 9, 11 and 12, zone 1 may be in an under-utilization state when zone 0 commands are executed in the optional resources 916 configured for zone 0 (e.g. the commands are within command group 1106 or 1206 of FIG. 11 or 12), thus preventing zone 1 commands from being executed in the essential resources 914 configured for zone 1. The controller may release the optional set of resources for use by the another one of the zones when the one of the zones is in the over-utilization state or the another one of the zones is in the under-utilization state. Thus, the controller may change the priority order of the commands when the one of the zones is in the over-utilization state or the another one of the zones is in the under-utilization state. For instance, referring to FIGS. 9 and 10, if the controller determines at 1014 that a zone is being over-utilized (or another zone is being under-utilized), the controller may at 1018 release optional resources 916 for the under-utilized zone to have access to its essential resources 914. Similarly, if the controller determines at 1014 that a zone is being under-utilized (or another zone is being over-utilized), the controller may at 1022 thrash the over-utilized zone so that the under-utilized zone has access to its essential resources 914. Thus, the priority order of queued commands may be changed from an over-utilized zone to an under-utilized zone.

As represented by block 1514, the controller may execute the commands in the memory according to the priority order. For example, the controller may execute the commands in the zone resources, which may include an essential set of resources and an optional set of resources for each zone. Referring to FIGS. 1 and 9-12, the controller 123 may execute zone 0 commands and zone 1 commands in the NVM 110 (e.g. in dies 114, 902) in their respective zone resources 908 (e.g. essential resources 914 and optional resources 916) according to the re-shuffled order described above with respect to FIGS. 10, 11, and 12. For example, after segregating the commands at 1510 and as represented by block 1516, the controller may execute one of the segregated commands in the essential set of resources for one of the zones, and simultaneously or in parallel execute another of the segregated commands in the essential set of resources for another one of the zones. For instance, referring to FIGS. 10, 11 and 12, after segregating the commands at 1004, when the controller decides the commands to select for execution at 1008, the controller 123 may identify several commands within window 1102 that together fall within an essential resource limit for zones 0 and 1 (e.g. command group 1104 or 1204), and the controller may execute the zone 0 commands and zone 1 commands within that command group simultaneously in the essential resources 914 for each zone.

In one example, the controller may execute one of the segregated commands in the essential set of resources for the one of the zones based on a data length associated with the one of the segregated commands. For instance, referring to FIG. 11, the controller 123 may identify zone 0 or zone 1 commands that include a data length (e.g. 64 KB, 16 KB, 4 KB, etc.) meeting the essential resource limit identified for each zone (e.g. 96 KB for zone 0 and 32 KB for zone 1), and the controller may categorize these commands together as part of command group 1104. The controller 123 may then execute the zone 0 and zone 1 commands in the essential resources 914 associated with those zones 906.

In another example, as represented by block 1518, the controller may split the one of the segregated commands into portions based on a data length associated with the one of the segregated commands, and as represented by block 1520, the controller may execute one of the portions in the essential set of resources for the one of the zones. For instance, referring to FIG. 12, the controller 123 may split large commands 1208 (e.g. with larger data lengths such as 1 MB, 256 KB, etc.) into portions 1210 (e.g. with smaller data lengths 16 KB, 32 KB, etc.) that meet the essential resource limit identified for each zone, and the controller may categorize these portions of the large commands with the smaller commands in command group 1204. The controller 123 may then execute the split, zone 0 and zone 1 commands in the essential resources 914 associated with those zones 906.

Finally, as represented by block 1522, the controller may execute the segregated commands in the essential set of resources for each of the zones in an interleaved manner. For example, the controller may interleave execution of the segregated commands in the essential set of resources for each of the zones. For instance, referring to FIGS. 9-12, after segregating the commands at 1004 and when the controller decides the commands to select for execution at 1008, the controller may interleave the zone 0 and zone 1 commands as illustrated for example at 1212. The interleaving may occur after the controller optionally splits the large commands 1208 into portions 1210 for writing to essential resources 914.

Accordingly, the storage device described in the present disclosure cost-effectively provides improved performance or throughput with reduced latency in handling zone write commands. Commands may be re-prioritized for optimal zone utilization based on essential and optional resources and current zone utilization states. Lower latencies may be achieved overall for each zone and dynamically tuned for optimal zone performance based on currently executed zone commands, zone targets or requirements, and utilization states. Balancing of zone writes may also be achieved by providing optimal utilization of shared resources (e.g. dies or channels) in the overall device through the utilization of essential and optional resources for each zone. As a result, the starvation effect between zones may be mitigated without limitation on zone speeds in contrast to dedicated die approaches.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
   a memory; and
   a controller configured to receive, from a host, commands associated with a plurality of zones, to change a priority order of the commands based on zone properties indicated by the host for the zones, and to execute the commands in the memory according to the changed priority order;
   wherein the controller is further configured to allocate from the memory a first set of resources and a second set of resources for each of the zones, the first set of resources of a respective zone satisfying the zone properties of the respective zone, and
   wherein the controller is further configured to execute one of the commands for the respective zone simultaneously in the first set of resources and the second set of resources.

2. The storage device of claim 1, wherein the zone properties include at least one of a minimum speed associated with each zone, a maximum speed associated with each zone, or a requested latency associated with each zone.

3. The storage device of claim 1, wherein the first set of resources and the second set of resources each comprise a zone resource, the zone resource comprising a memory die, a plane, a block, or a page.

4. The storage device of claim 1, wherein the controller is configured to segregate the commands between the zones, to execute one of the segregated commands in the first set of resources for one of the zones, and to simultaneously execute another of the segregated commands in the first set of resources for another one of the zones.

5. The storage device of claim 4, wherein the controller is further configured to execute the one of the segregated commands in the first set of resources for the one of the zones based on a data length associated with the one of the segregated commands.

6. The storage device of claim 4, wherein the controller is further configured to split the one of the segregated commands into portions based on a data length associated with the one of the segregated commands, and to execute one of the portions in the first set of resources for the one of the zones.

7. The storage device of claim 4, wherein the controller is further configured to execute the segregated commands in the first set of resources for each of the zones in an interleaved manner.

8. The storage device of claim 1, wherein the controller is further configured to identify a utilization state of the memory for one of the zones, and to change the priority order of the commands based on the utilization state for the one of the zones.

9. A storage device, comprising:
   a memory; and
   a controller configured to receive, from a host, commands associated with a plurality of zones, to allocate from the memory a plurality of zone resources based on zone properties indicated by the host for the zones, and to execute the commands in the zone resources;
   wherein the zone resources comprise a first set of resources and a second set of resources for each of the zones, the first set of resources of a respective zone satisfying the zone properties of the respective zone; and
   wherein the controller is further configured to execute one of the commands for the respective zone simultaneously in the first set of resources and the second set of resources.

10. The storage device of claim 9, wherein the zone properties include a minimum speed or a maximum speed associated with each zone.

11. The storage device of claim 9, wherein the zone resources comprise a plurality of memory dies, planes, blocks, or pages.

12. The storage device of claim 9, wherein the controller is further configured to segregate the commands between the zones, to execute one of the segregated commands in the first set of resources for one of the zones, and to execute in parallel another of the segregated commands in the first set of resources for another one of the zones.

13. The storage device of claim 12, wherein the controller is further configured to interleave execution of the segregated commands in the first set of resources for each of the zones.

14. The storage device of claim 9, wherein the controller is further configured to identify a utilization state of the memory for one of the zones, and to change a priority order of the commands based on the utilization state for the one of the zones.

15. A storage device, comprising:
   a memory; and
   a controller configured to receive, from a host, commands associated with a plurality of zones, to identify a utilization state of the memory for one of the zones, and to change a priority order of the commands based on the utilization state for the one of the zones;
   wherein the controller is further configured to allocate from the memory a first set of resources and a second set of resources for each of the zones, the first set of resources of a respective zone satisfying zone properties indicated by the host for the respective zone, and
   wherein the controller is further configured to execute one of the commands for the respective zone simultaneously in the first set of resources and the second set of resources.

16. The storage device of claim 15, wherein the first set of resources and the second set of resources each comprise at least one memory die, at least one plane, at least one block, or at least one page.

17. The storage device of claim 15, wherein the utilization state for the one of the zones comprises an over-utilization state when the commands associated with the one of the zones are executed in the second set of resources for the one of the zones.

18. The storage device of claim 15, wherein the utilization state for the one of the zones comprises an under-utilization state when the commands associated with another one of the zones are executed in the first set of resources for the one of the zones.

19. The storage device of claim 15, wherein the controller is further configured to release the second set of resources for the one of the zones for use by another one of the zones when the one of the zones is in an over-utilization state or the another one of the zones is in an under-utilization state.

20. The storage device of claim 15, wherein the controller is further configured to change the priority order of the commands when the one of the zones is in an over-utilization state or another one of the zones is in an under-utilization state.

* * * * *